(12) United States Patent
Harvey et al.

(10) Patent No.: US 12,246,431 B2
(45) Date of Patent: Mar. 11, 2025

(54) DETHATCHER SYSTEMS AND METHODS

(71) Applicant: Briggs & Stratton, LLC, Wauwatosa, WI (US)

(72) Inventors: Kyle Harvey, West Allis, WI (US); Ryan Jaskowiak, Mukwonago, WI (US); Matthew S. Zurawski, Whitewater, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 18/517,729

(22) Filed: Nov. 22, 2023

(65) Prior Publication Data

US 2024/0081163 A1    Mar. 14, 2024

Related U.S. Application Data

(63) Continuation of application No. 17/240,328, filed on Apr. 26, 2021, now Pat. No. 11,832,542, which is a
(Continued)

(51) Int. Cl.
*B25G 3/38*      (2006.01)
*A01B 45/02*     (2006.01)
(Continued)

(52) U.S. Cl.
CPC .............. *B25G 3/38* (2013.01); *A01B 45/026* (2013.01); *A01D 43/14* (2013.01); *A01B 1/06* (2013.01);
(Continued)

(58) Field of Classification Search
CPC ...... B25G 3/38; B25F 5/02; A47J 2037/0777; A01G 20/47; A01D 2101/00;
(Continued)

(56) References Cited

U.S. PATENT DOCUMENTS 1,538,381 A    5/1925  Bull
1,816,980 A    8/1931  Lontz
(Continued)

FOREIGN PATENT DOCUMENTS

CA        2829898 A1    4/2014
CN      104025798 A     9/2014
(Continued)

OTHER PUBLICATIONS

Billy Goat Overseeder/Power Rake Owner's Manual, Part No. 350412, Form No. F052215A, 16 pages.
(Continued)

*Primary Examiner* — Arpad Fabian-Kovacs
(74) *Attorney, Agent, or Firm* — Foley & Lardner LLP

(57) ABSTRACT

A method of stacking dethatchers includes pivoting an upper portion of a handle on a first dethatcher toward a front end of a frame on the first dethatcher, upon pivoting the upper portion of the handle toward the front end of the frame, exposing a rear support point defined by a lower portion of the handle, and stacking a second dethatcher on the first dethatcher so that the second dethatcher is supported on the rear support point defined by the lower portion of the handle and a front support point defined by the upper portion of the handle.

18 Claims, 26 Drawing Sheets

Related U.S. Application Data continuation of application No. 16/825,810, filed on Mar. 20, 2020, now Pat. No. 11,006,572, which is a continuation of application No. 15/689,777, filed on Aug. 29, 2017, now Pat. No. 10,595,460.

(60) Provisional application No. 62/432,997, filed on Dec. 12, 2016, provisional application No. 62/380,631, filed on Aug. 29, 2016.

(51) Int. Cl.

| | |
|---|---|
| *A01D 43/14* | (2006.01) |
| *A01B 1/06* | (2006.01) |
| *A01B 33/10* | (2006.01) |
| *A01B 33/14* | (2006.01) |
| *A01B 45/00* | (2006.01) |
| *A01D 34/47* | (2006.01) |
| *A01D 34/67* | (2006.01) |
| *A01D 34/82* | (2006.01) |
| *A01D 43/063* | (2006.01) |
| *A01D 75/00* | (2006.01) |
| *A01D 101/00* | (2006.01) |
| *A01G 20/47* | (2018.01) |
| *A47J 37/07* | (2006.01) |
| *B25F 5/02* | (2006.01) |

(52) U.S. Cl.
CPC ........... *A01B 33/103* (2013.01); *A01B 33/142* (2013.01); *A01B 45/00* (2013.01); *A01B 45/02* (2013.01); *A01D 34/475* (2013.01); *A01D 34/67* (2013.01); *A01D 34/824* (2013.01); *A01D 43/063* (2013.01); *A01D 75/006* (2013.01); *A01D 2101/00* (2013.01); *A01G 20/47* (2018.02); *A47J 2037/0777* (2013.01); *B25F 5/02* (2013.01)

(58) Field of Classification Search
CPC .... A01D 75/006; A01D 43/14; A01D 43/063; A01D 34/824; A01D 34/67; A01D 34/475; A01B 45/026; A01B 45/02; A01B 45/00; A01B 33/142; A01B 33/103; A01B 1/06

See application file for complete search history.

(56) References Cited

U.S. PATENT DOCUMENTS

| | | |
|---|---|---|
| 2,162,783 A | 6/1939 | Moyer |
| 2,283,161 A | 5/1942 | Booton |
| 2,786,694 A | 3/1957 | Gray |
| 2,861,411 A | 11/1958 | Shock |
| 3,481,123 A | 12/1969 | Lessig, III |
| 3,564,823 A | 2/1971 | Rhoads |
| 3,758,967 A | 9/1973 | Thompson |
| 3,764,156 A | 10/1973 | Nepper et al. |
| 3,783,592 A | 1/1974 | Schraut |
| 3,802,170 A | 4/1974 | Seifert et al. |
| 3,945,176 A | 3/1976 | Vicendese et al. |
| 3,998,034 A | 12/1976 | Rubin |
| 4,041,679 A | 8/1977 | Seifert et al. |
| 4,068,455 A | 1/1978 | Zehrung et al. |
| 4,191,007 A | 3/1980 | Check et al. |
| 4,250,695 A | 2/1981 | Comer et al. |
| 4,265,079 A * | 5/1981 | Hoffmann ............ A01D 43/063 56/16.6 |
| 4,344,273 A | 8/1982 | Jobling et al. |
| 4,446,681 A | 5/1984 | Dynie et al. |
| 4,467,591 A | 8/1984 | Dynie |
| 4,561,239 A | 12/1985 | Cook |
| 4,563,867 A | 1/1986 | Bokon |
| 4,601,163 A | 7/1986 | Trelford |
| 5,036,651 A | 8/1991 | Nelson |
| 5,052,135 A | 10/1991 | Fontaine |
| 5,163,275 A | 11/1992 | Hare et al. |
| 5,197,267 A | 3/1993 | Aldred et al. |
| 5,318,180 A * | 6/1994 | Grigsby ................ B65D 85/68 206/319 |
| 5,577,375 A | 11/1996 | Tillison, Sr. |
| 5,636,504 A | 6/1997 | Kaley et al. |
| 5,645,293 A | 7/1997 | Cheng |
| 5,822,965 A | 10/1998 | Chesack et al. |
| 6,073,945 A | 6/2000 | Cheng |
| 6,237,313 B1 | 5/2001 | Leden |
| 6,945,021 B2 | 9/2005 | Michel |
| 7,121,071 B2 | 10/2006 | Berkeley |
| 7,231,755 B2 | 6/2007 | Clarke |
| 8,104,252 B1 | 1/2012 | Godley, Jr. |
| 8,161,720 B1 | 4/2012 | Humphrey |
| 8,316,628 B2 | 11/2012 | Humphrey |
| 8,419,025 B2 | 4/2013 | Chen et al. |
| 8,544,251 B2 | 10/2013 | Goman et al. |
| 8,713,761 B2 | 5/2014 | Grewe et al. |
| 9,038,356 B2 | 5/2015 | Shao et al. |
| 9,386,743 B2 | 7/2016 | Baker |
| 9,491,907 B2 | 11/2016 | Edholm et al. |
| 2001/0039788 A1 | 11/2001 | Starr |
| 2002/0095922 A1 | 7/2002 | Goman et al. |
| 2003/0019198 A1 | 1/2003 | Eavenson, Sr. |
| 2003/0155137 A1 | 8/2003 | Iacona |
| 2003/0178338 A1 * | 9/2003 | Vore ..................... B65D 5/5042 206/521 |
| 2006/0096136 A1 | 5/2006 | Shaffer et al. |
| 2007/0256401 A1 | 11/2007 | Hibi et al. |
| 2008/0196371 A1 | 8/2008 | Bryant et al. |
| 2010/0064556 A1 | 3/2010 | Lau |
| 2010/0192532 A1 | 8/2010 | Slater et al. |
| 2010/0199623 A1 | 8/2010 | Akahane |
| 2013/0047566 A1 | 2/2013 | Takahashi et al. |
| 2014/0102063 A1 | 4/2014 | Yamaoka et al. |
| 2014/0215989 A1 | 8/2014 | Pilon et al. |
| 2014/0230394 A1 | 8/2014 | Zerbarini |
| 2015/0101301 A1 | 4/2015 | Yamaoka et al. |
| 2016/0198627 A1 | 7/2016 | Wadzinski et al. |
| 2017/0086375 A1 | 3/2017 | Yamaoka et al. |
| 2020/0120867 A1 | 4/2020 | Yamaoka et al. |

FOREIGN PATENT DOCUMENTS

| | | | | |
|---|---|---|---|---|
| EP | 1512319 A2 | * | 3/2005 | ........... A01D 34/695 |
| EP | 1695610 A1 | * | 8/2006 | ............ A01D 34/81 |
| EP | 1 752 036 A1 | | 2/2007 | |
| EP | 3 014 972 A1 | | 5/2016 | |
| EP | 3 766 328 A1 | | 1/2021 | |
| GB | 2423001 A | * | 8/2006 | ........... A01D 43/063 |
| GB | 2 481 106 A | | 12/2011 | |
| JP | H0663745 U | * | 9/1994 | ............... E04H 6/04 |
| JP | 2007116954 A | * | 5/2007 | ............. A01D 34/68 |
| WO | WO-2017099644 A1 | * | 6/2017 | ............. A01D 34/00 |

OTHER PUBLICATIONS

Bluebird International Power Rake Operator Manual, Jul. 15, 2015, 32 pages.

Ryan Ren-O-Thin Power Rake, Specification Sheet, Schiller Grounds Care, Inc., dated Feb. 11, 2015, 1 page.

* cited by examiner

DETHATCHER SYSTEMS AND METHODS

CROSS-REFERENCE TO RELATED PATENT APPLICATIONS

This application is a continuation of U.S. patent application Ser. No. 17/240,328, filed Apr. 26, 2021, which is a continuation of U.S. patent application Ser. No. 16/825,810, filed Mar. 20, 2020, which is a continuation of U.S. patent application Ser. No. 15/689,777, filed Aug. 29, 2017, which claims priority to U.S. Provisional Patent Application No. 62/432,997, filed Dec. 12, 2016, and to U.S. Provisional Patent Application No. 62/380,631, filed Aug. 29, 2016, all of which are incorporated herein by reference in their entireties.

BACKGROUND

The current disclosure relates generally to power rake devices, also known as dethatchers. Thatch is a layer of semi-decomposed grass and other organic material that accumulates above the soil faster than it can be absorbed. Thatch forms a barrier between soil and the water, nutrients, and air required for a healthy lawn. It may also serve as a perfect breeding ground for damaging lawn diseases. However, thatch build-up is a normal occurrence and is not necessarily harmful to the lawn until it gets too thick. Poor mulching mower performance can be a one contributor to thatch build-up.

Power rake devices are configured to remove excess thatch from the lawn, generally by rotating metal tines through the lawn. Some of those skilled in the art recommend dethatching once thatch is over ½ inch thick, while others recommend dethatching once thatch is over 2 inches thick. For cool season grasses, power raking is recommended in early fall or spring. Warm season grasses, on the other hand, are recommended to be power raked in late spring to early summer. And it is generally desirable to have at least thirty days of growing season available following power raking.

FIGS. 1A-1C show PRIOR ART dethatchers 10a, 10b, 10c, which are respectively sold by Billy Goat Industries, Inc.; BlueBird International, Inc.; and Schiller Grounds Care, Inc. Each has a respective engine 12a, 12b, 12c that is located directly above a cutting reel and substantially along a side of the respective devices. FIG. 1D shows the PRIOR ART BlueBird dethatcher 10b with a bagger 20 attached.

SUMMARY

One embodiment relates to a dethatcher including a frame having a front and a rear end, a handle coupled to the frame and movable between a use position and a storage position, multiple wheels coupled to the frame, a cutting reel housed in the frame, and an engine for powering a drive mechanism of the shaft. The cutting reel includes a shaft having a first end and a second end, at least one cutting mechanism located between the first end and the second end of the shaft, and the drive mechanism for powering the shaft. When the handle is in the use position, the handle extends away from the front end of the frame and when the handle is in the storage position the handle extends toward the front end of the frame.

Another embodiment relates to a dethatcher including a frame having front and rear ends, a cover coupled to the frame and movable between an open position and a closed positon, a handle coupled to the frame and movable between a use position and a storage position, multiple wheels coupled to the frame, a cutting reel housed in the frame, and an engine for powering the cutting reel. When the handle is in the use position, the handle extends away from the cover and when the handle is in the storage position the handle extends toward the cover.

Another embodiment relates to a dethatcher including a frame having a front end and a rear end and defining a frame opening, a cover coupled to the frame and movable between an open position and a closed position, a handle coupled to the frame and movable between a use position and a storage position, multiple wheels coupled to the frame, a bagger removably coupled to the frame, a cutting reel housed in the frame, and an engine for powering the cutting reel. When the handle is in the use position, the handle extends away from the cover and when the handle is in the storage position the handle extends toward the cover. When the cover is in the open position, the bagger is configured to receive debris including thatch from the cutting reel.

Another embodiment relates to a method of stacking dethatchers. The method includes positioning a first dethatcher, pivoting a handle of the first dethatcher into a storage position, stacking a second dethatcher on the first dethatcher.

Another embodiment relates to a method of stacking dethatchers. The method includes pivoting an upper portion of a handle on a first dethatcher toward a front end of a frame on the first dethatcher, upon pivoting the upper portion of the handle toward the front end of the frame, exposing a rear support point defined by a lower portion of the handle, and stacking a second dethatcher on the first dethatcher so that the second dethatcher is supported on the rear support point defined by the lower portion of the handle and a front support point defined by the upper portion of the handle.

Another embodiment relates to a dethatcher assembly that includes a first dethatcher having a first frame and a first handle coupled to the first frame. The first handle includes a first upper portion pivotably coupled to a first lower portion so that the first upper portion is configured to pivot between a use position and a storage position. The dethatcher assembly further includes a second dethatcher having a second frame, and a second handle coupled to the second frame. When the first upper portion is in the storage position, the second dethatcher is configured to stack upon the first dethatcher so that the second dethatcher is supported on the first handle of the first dethatcher.

DETAILED DESCRIPTION

Figure 1A:
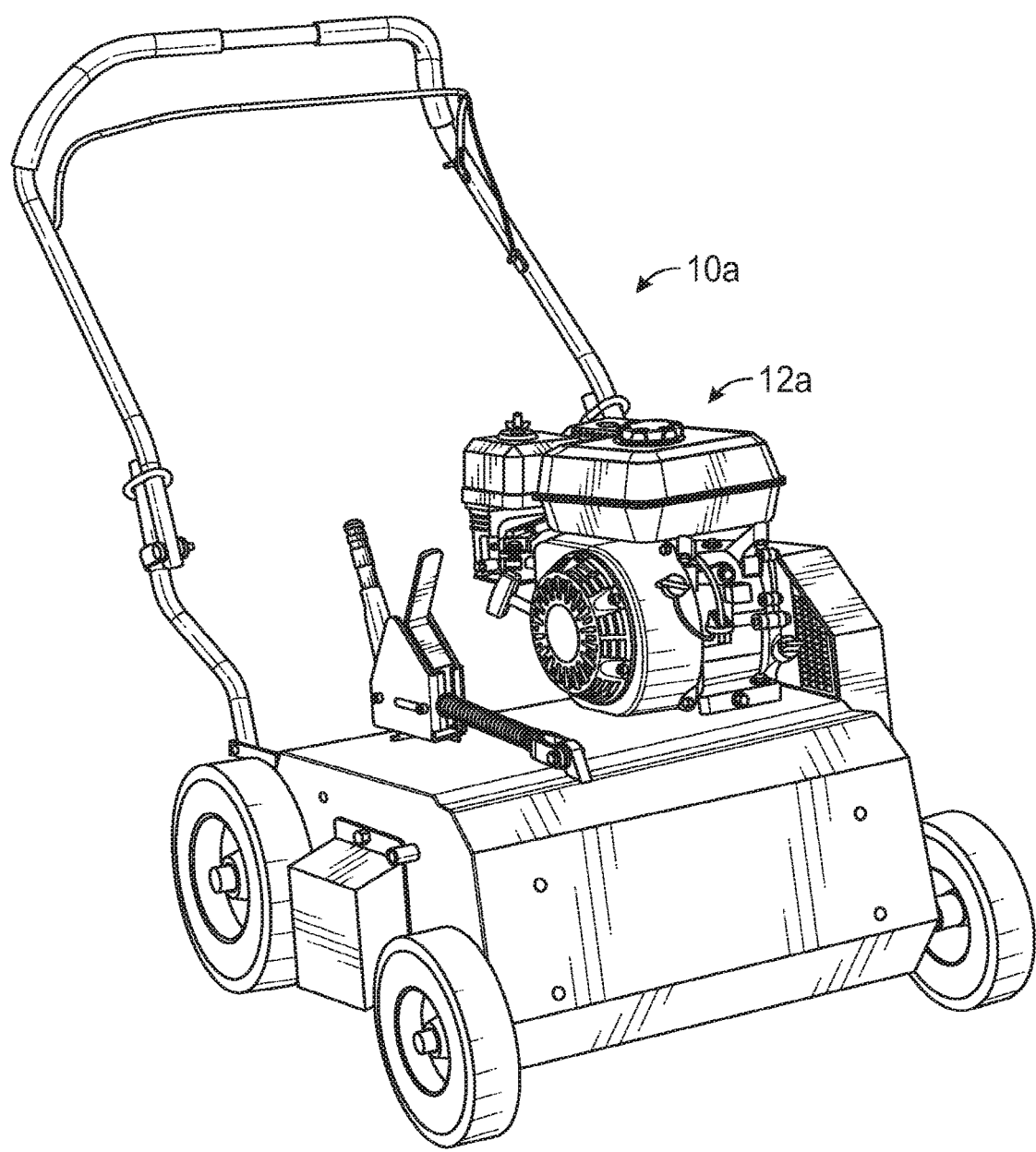
FIGS. 1A through 1E illustrate PRIOR ART dethatchers and components.
Figure 1B:
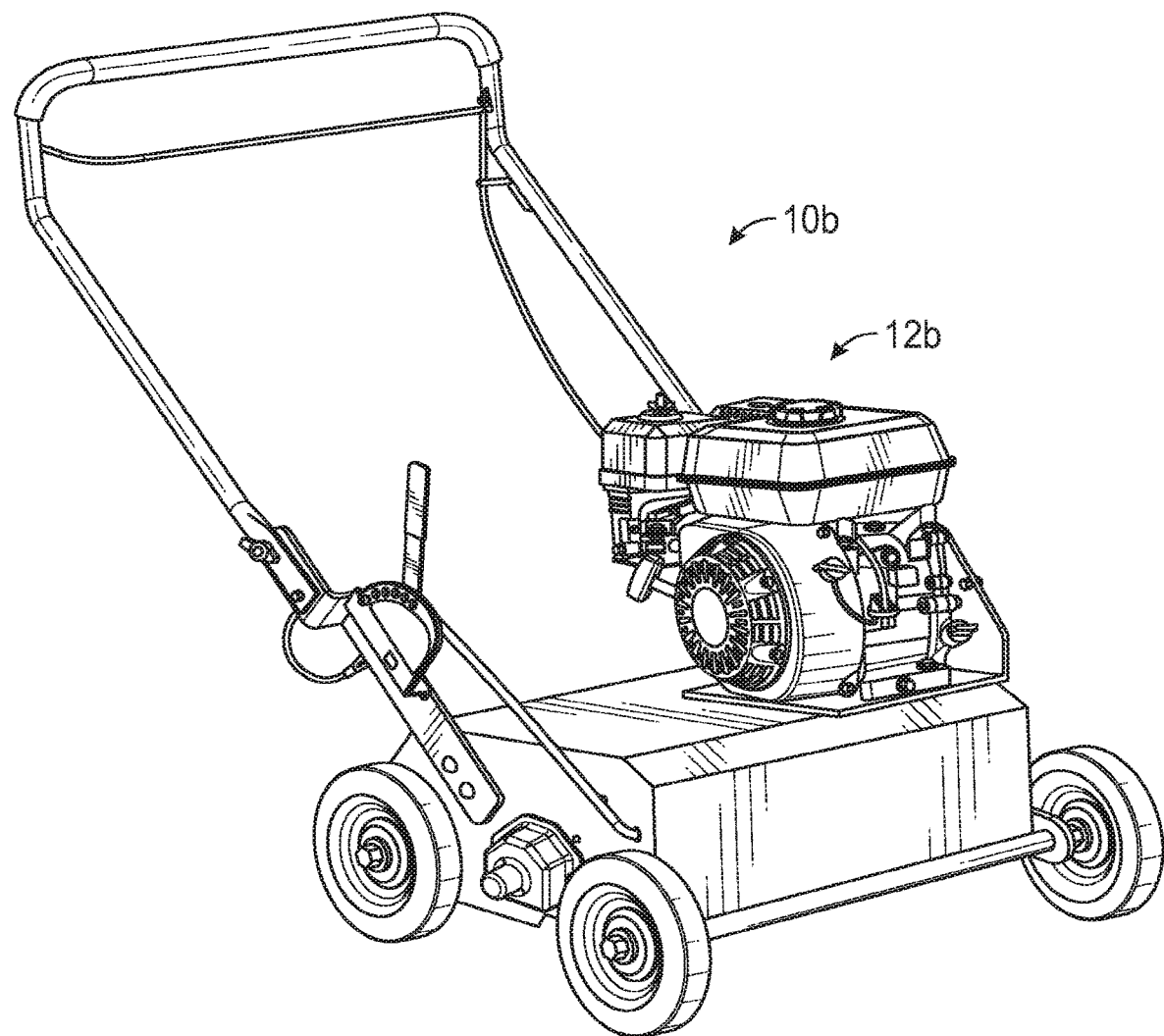
Figure 1C:
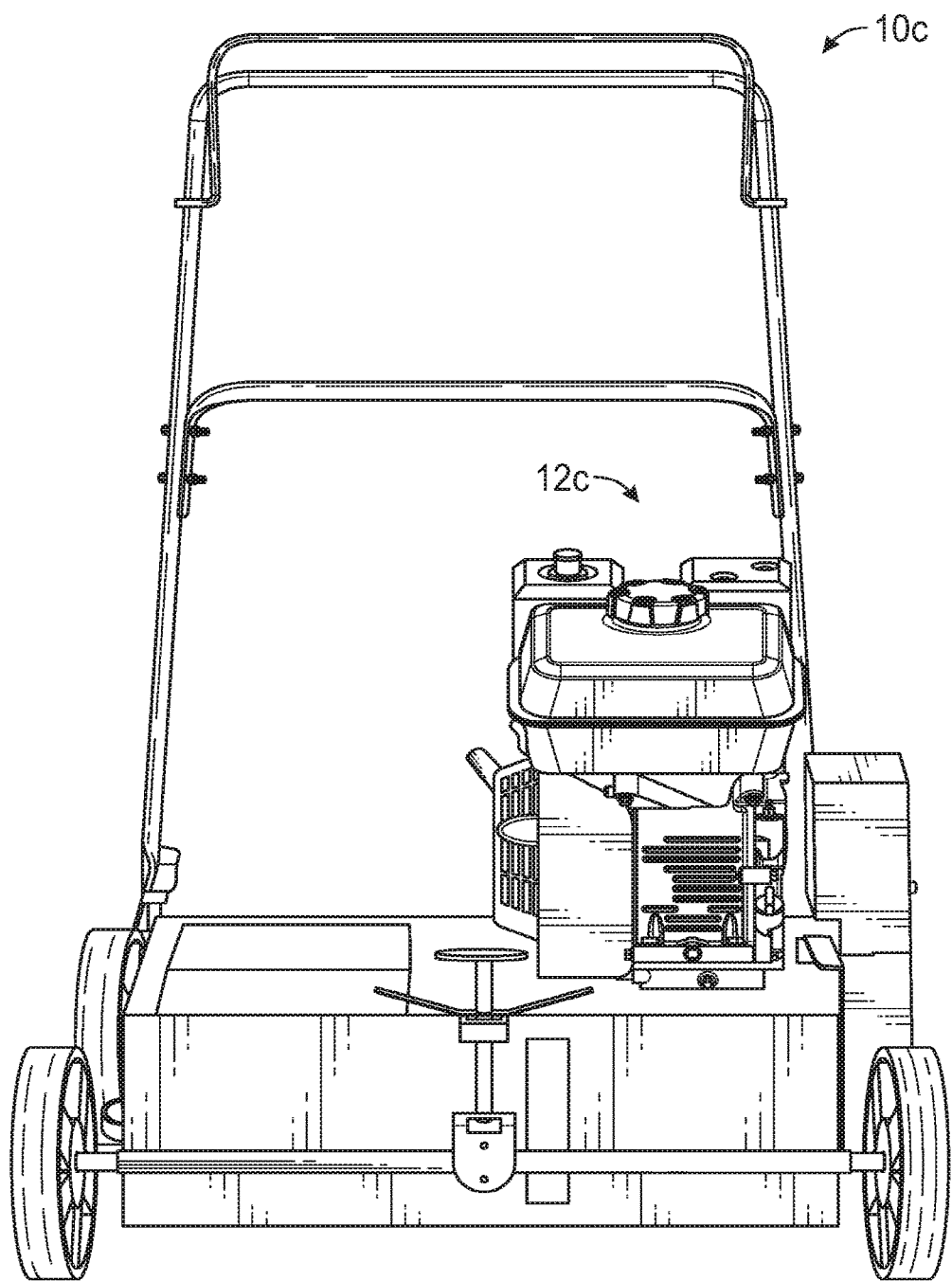

FIGS. 2A through 15 illustrate a power rake (or "dethatcher") 100, according to one embodiment. The dethatcher 100 broadly includes a frame 110, wheels 112, a cutting reel 120, an engine 130, a handle 140, and a power transmitting and user control system 150.

The frame 110 has front and rear ends 110a, 110b and opposed sides 110c, 110d, and the wheels 112 allow the frame 110 to be easily transported. The dethatcher 110 has two of the wheels 112 at each side 110c, 110d, with one wheel 112 on each side 110c, 110d being close to the front end 110a and one wheel 112 on each side 110c, 110d being close to the rear end 110b. The two wheels 112 at the front end 110a may be referred to as front wheels 112a, and the two wheels 112 at the rear end 110b may be referred to as rear wheels 112b. The front wheels 112a may be coupled to the frame 110 by a solid axle or by independent shafts, and the rear wheels 112b may similarly be coupled to the frame 110 by a solid axle or by independent shafts. If a self-propel feature is desired, it may be beneficial for the rear wheels 112b to be coupled to a solid axle 113 as shown in FIGS. 5A and 5B and discussed further below.

Figure 14A:
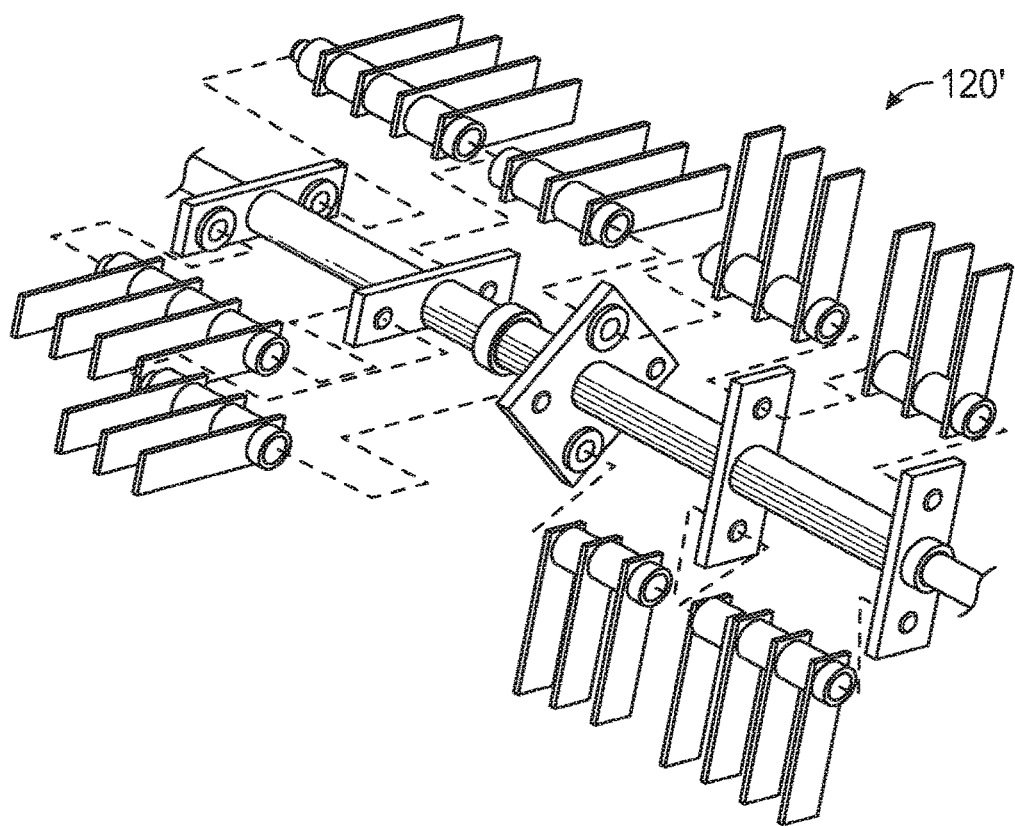
FIG. 14A is a perspective view of a flail reel which may be used in the dethatcher of FIG. 2A according to some embodiments.
Figure 14B:
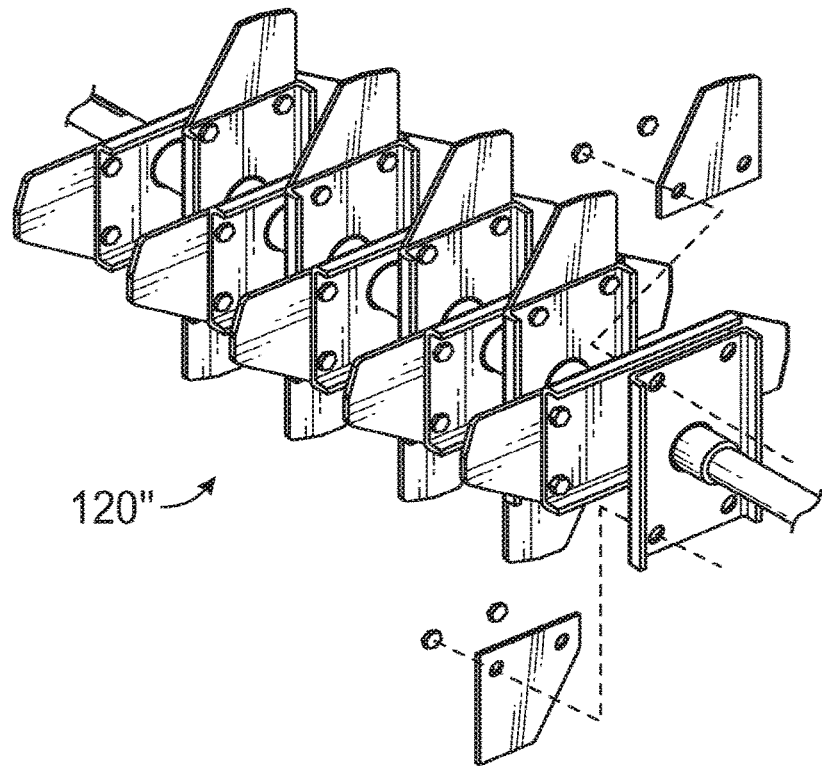
FIG. 14B is a perspective view of a slicing reel which may be used in the dethatcher of FIG. 2A according to some embodiments.
Figure 14C:
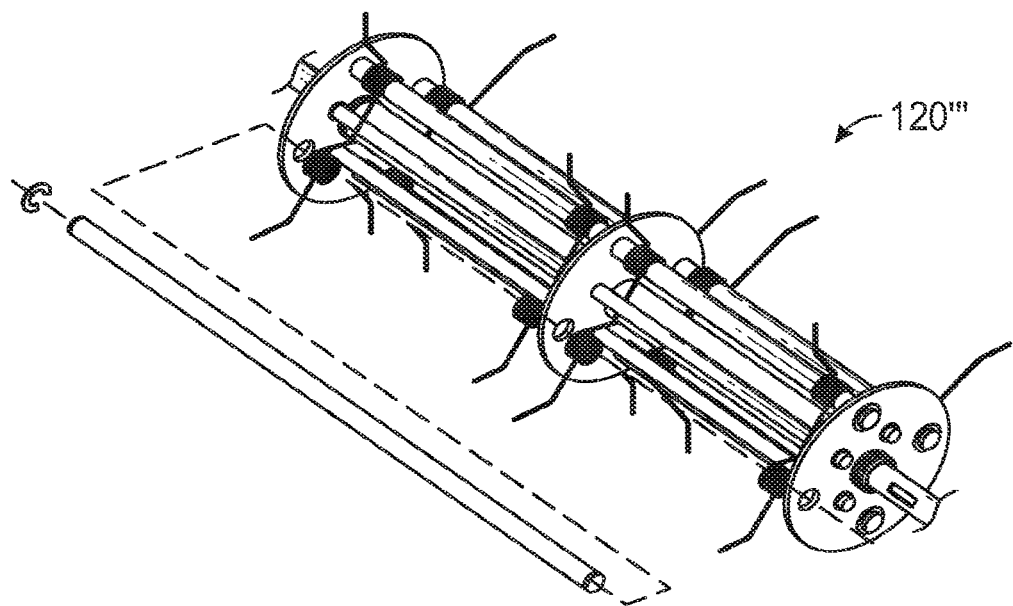
FIG. 14C is a perspective view of a spring tine reel which may be used in the dethatcher of FIG. 2A according to some embodiments.

The cutting reel 120 has opposed ends 120a, 120b with at least one cutting mechanism 125 therebetween. Any appropriate cutting mechanisms may be used, whether now known in the art or later developed. Example cutting mechanisms may include flail reels 120' (FIG. 14A), slicing reels 120'' (FIG. 14B), and spring tine reels 120''' (FIG. 14C). End 120a is configured to be attached to the frame 110, such as through bolts 121 or other appropriate fasteners. More particularly, a collar 122 (FIGS. 5A and 6A) may be integral with the end 120a or may be used with the end 120a, and the fastener may interact with the collar 122 and the frame 110 such that the end 120a is rotatable within the collar 122. Ball bearings and lubricants may reduce friction between the end 120a and the collar 122 such that the collar 122 is part of a split bearing block. End 120b is also configured to be attached to the frame 110 (again, through bolts 121 or other appropriate fasteners as well as another collar 122) and further includes a drive mechanism 124 (e.g., a sprocket or pulley) which is powered by the power transmitting system 150.

Figure 2A:
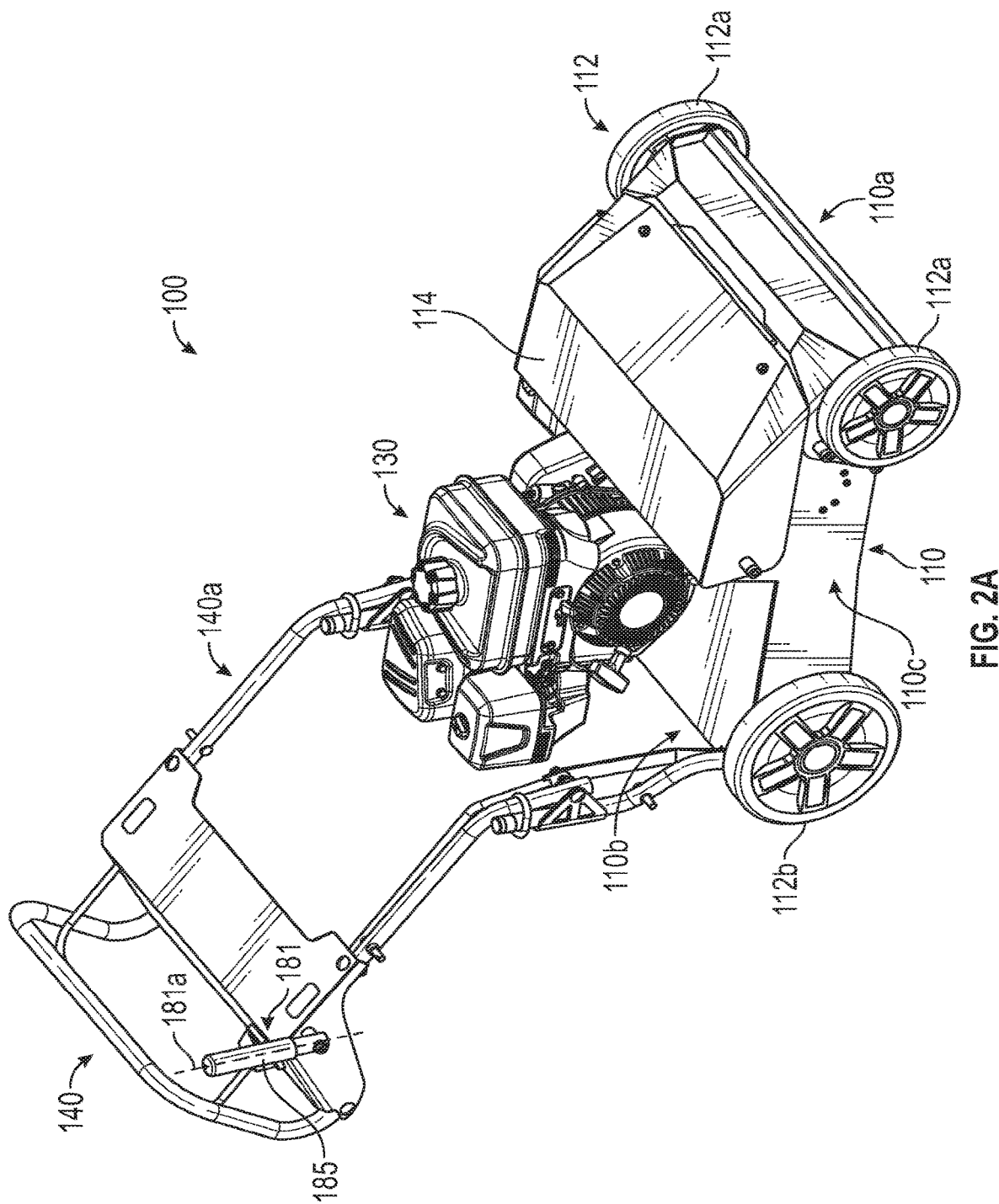
FIG. 2A is a perspective view of a dethatcher according to some embodiments.
Figure 2B:
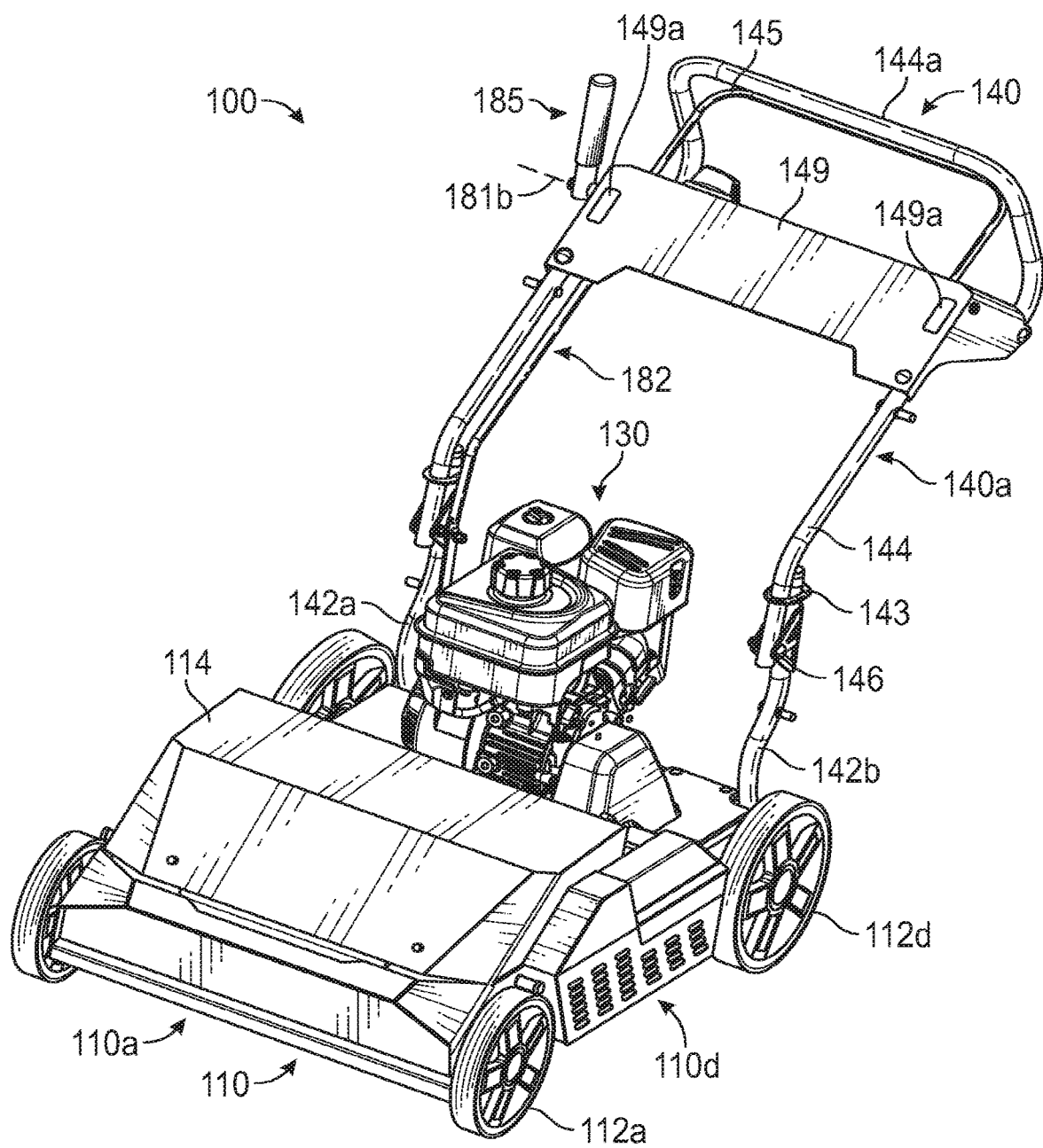
FIG. 2B is another perspective view of the dethatcher of FIG. 2A according to some embodiments.
Figure 5A:
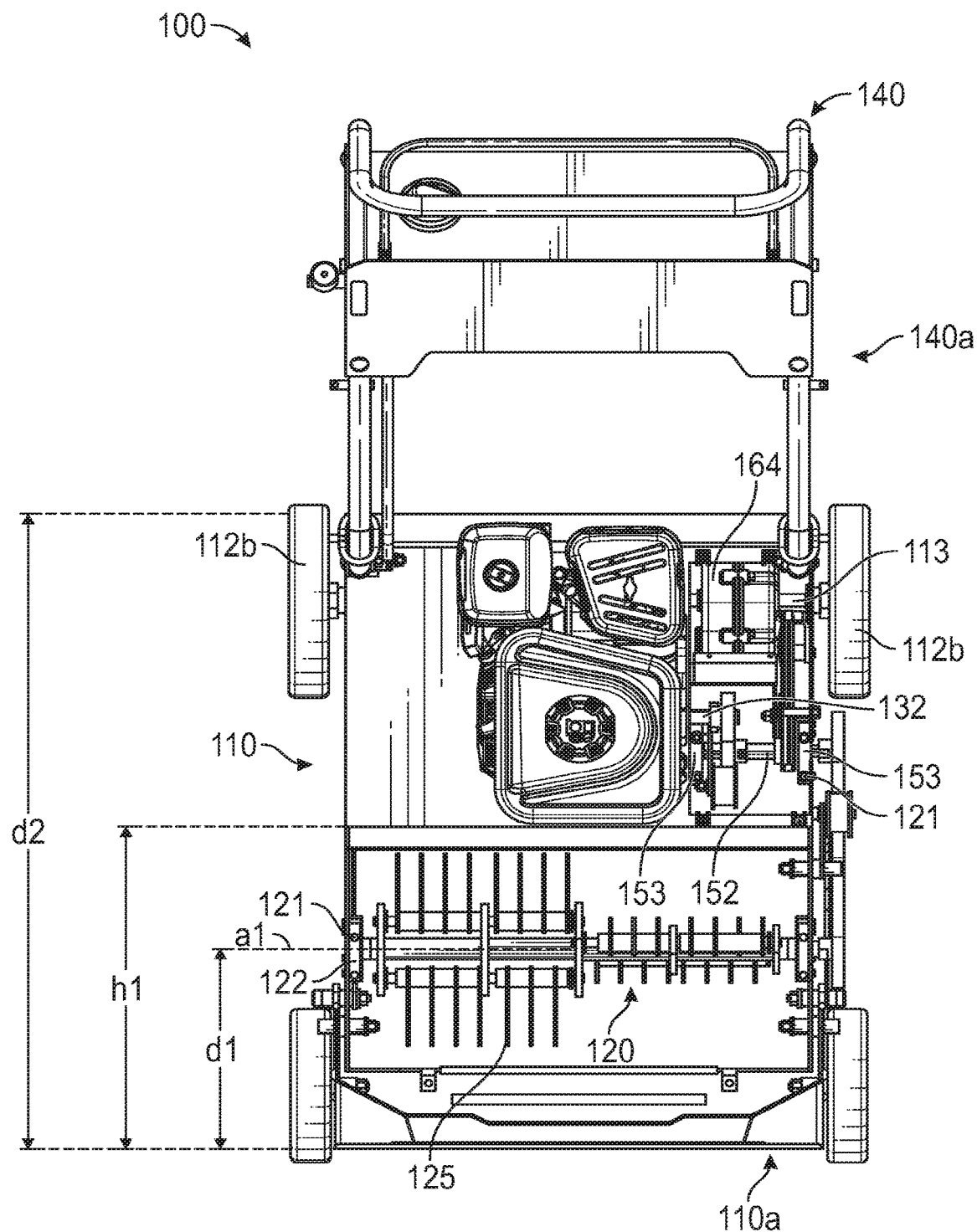
FIG. 5A is a top view of the dethatcher of FIG. 2A, shown with portions removed for illustration according to some embodiments.
Figure 5B:
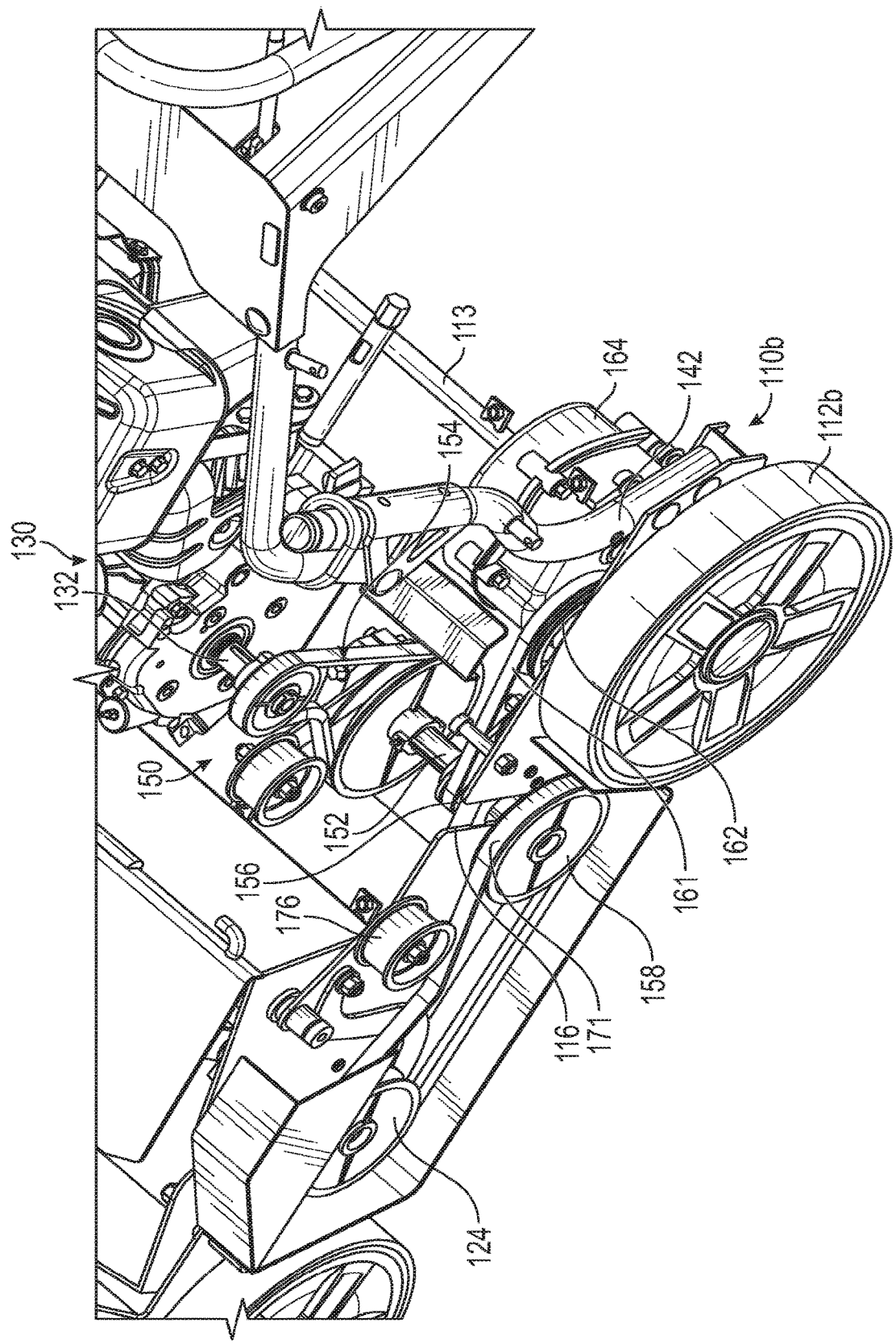
FIG. 5B is a partial perspective of the dethatcher of FIG. 2A, shown with portions removed for illustration according to some embodiments.
Figure 6A:
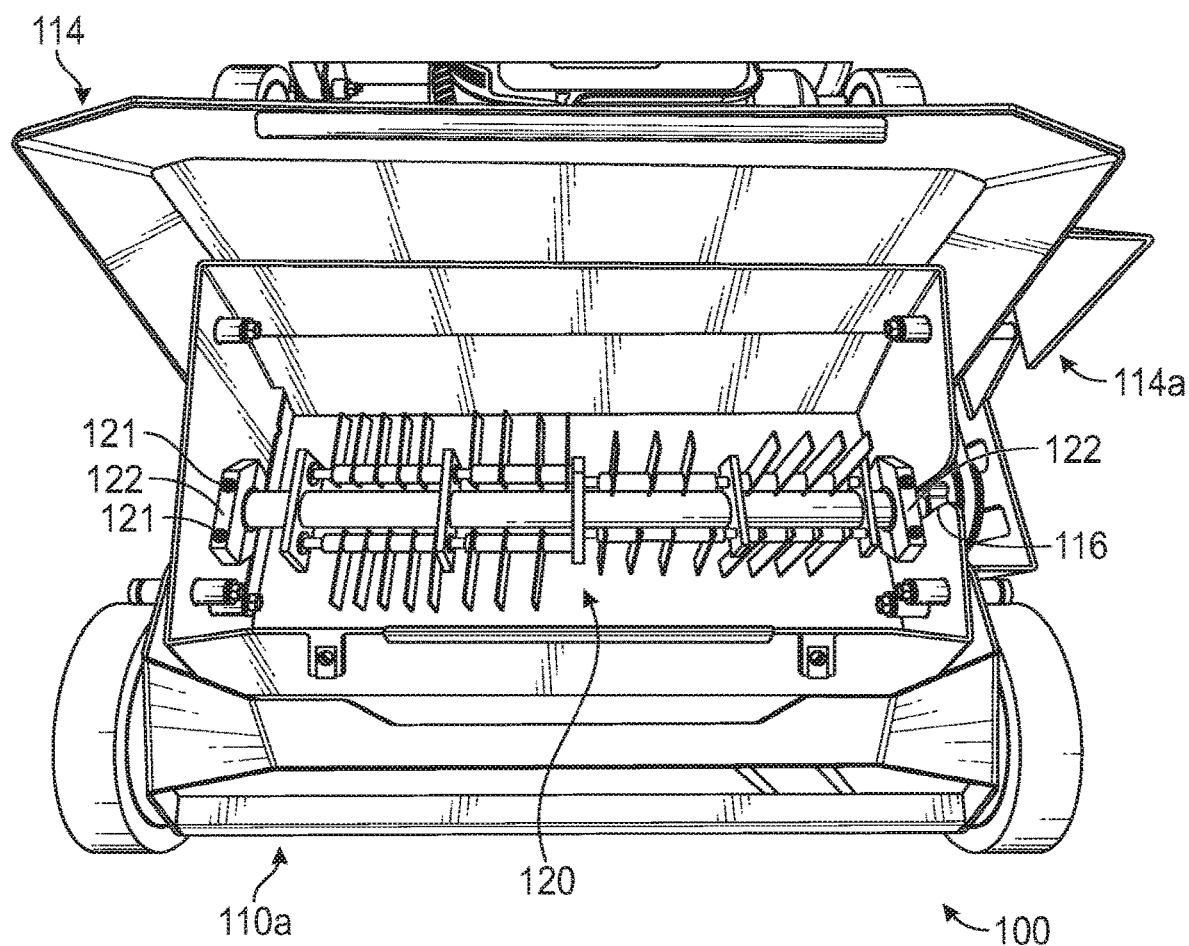
FIG. 6A is a partial front perspective view of the dethatcher of FIG. 2A, shown with the cutting reel exposed for illustration according to some embodiments.

As shown in FIG. 5A, the cutting reel 120 is housed in the frame 110. In some embodiments, the cutting reel 120 may be located entirely in a front half h1 of the frame 110, and it may be desirable for an axis a1 of the cutting reel 120 to be located at a distance d1 from the frame front end 110a that is no more than a third of the overall frame length d2. The frame 110 may include a cover 114, as shown in FIGS. 2A, 2B, and 6A, providing selective access to the cutting reel 120 from above. In other words, the user may alternately conceal (FIGS. 2A and 2B) and expose (FIG. 6A) the cutting reel 120 using the cover 114. In one embodiment, access to the cutting reel 120 from above may only occur when the cover 114 is opened (FIG. 6A). The ability to access the cutting reel 120 from above allows the cutting reel 120 to be removed and replaced (e.g., by removing the bolts 121 and the collars 122) with a sharper reel 120 and/or a different type of reel 120 without lifting or tilting the dethatcher 100 to access the cutting reel 120 from the underside of the dethatcher frame 110. This is a substantial improvement over prior art dethatchers which require such lifting or tilting (and which thus may need fuel and/or other fluids to be drained or result in fluid leakage) and which require a significant amount of time to remove and replace a cutting reel.

A slit 116 (FIGS. 5B and 6A) in the frame 110 may allow part of the reel end 120b to pass therethrough such that the drive mechanism 124 is separated from the cutting mechanism 125 and thereby shielded from debris. But to provide concurrent access to the drive mechanism 124 and the cutting reel 120, a cover 114a providing selective access to the drive mechanism 124 may be fixed to the cover 114 such that the covers 114, 114a move together as shown in FIG. 6A. In other words, the user may alternately conceal and expose the drive mechanism 124 using the cover 114a; access to the drive mechanism 124 from above may only occur when the cover 114a is opened, and the covers 114 and 114a may move together to facilitate changing out the cutting reel 120.

Figure 6B:
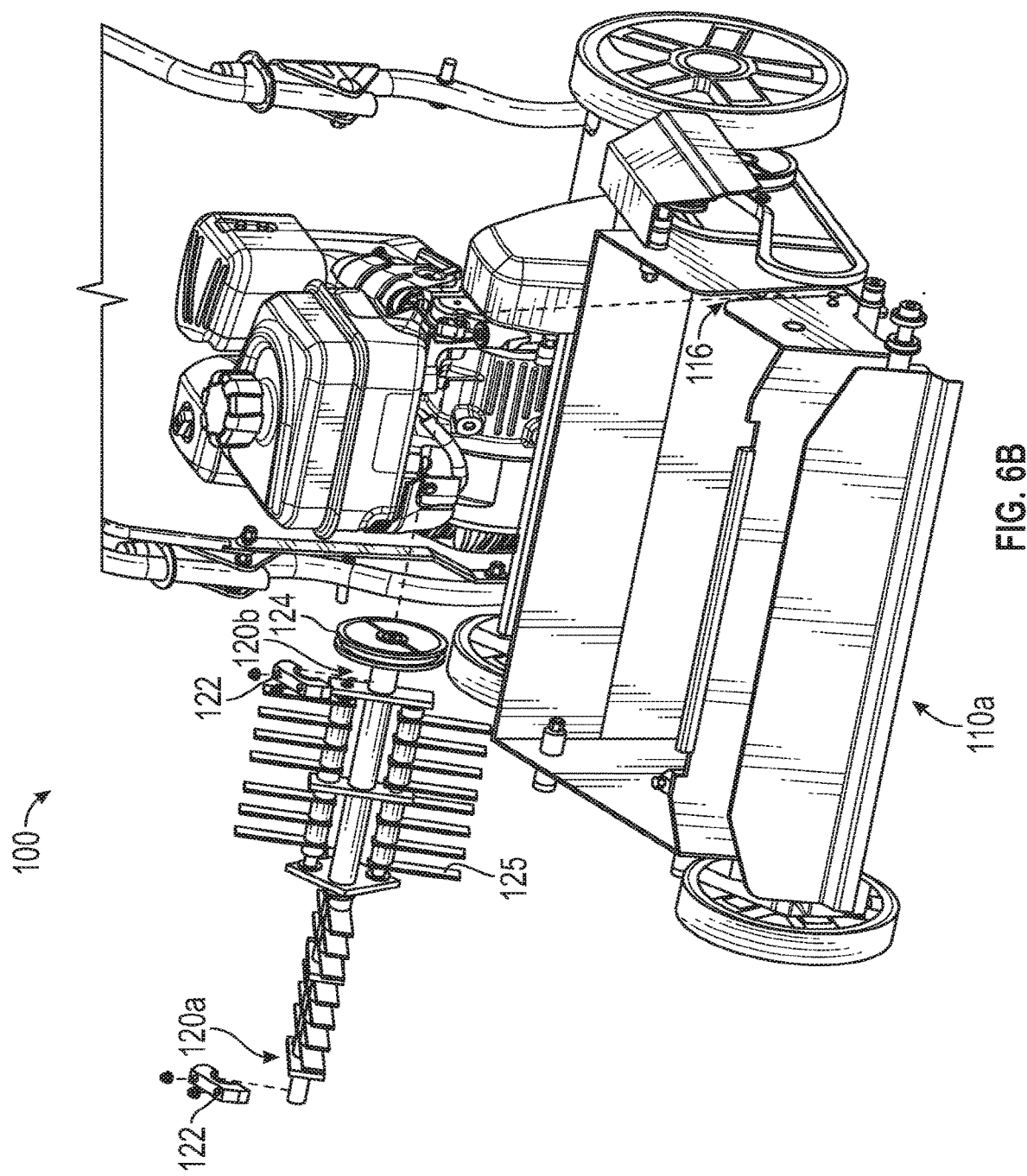
FIG. 6B is a partial perspective view of the dethatcher of FIG. 2A, shown with the cutting reel uninstalled and portions removed for illustration according to some embodiments.

FIGS. 4, 5A, 6A, and 7A show the cutting reel 120 installed, and FIG. 6B shows the cutting reel 120 separated from the frame 110. It is not uncommon for prior art cutting mechanisms 125 to be undesirably worn after even a few (e.g., four or five) uses. The top access to the cutting reel 120 and the ease of changing the cutting reel 120 (including but not limited to avoiding fluid drainage or spillage, avoiding the need for a lift or blocks, and substantially shortening the amount of time required compared to the prior art, as discussed above) are accordingly significant advances over prior art devices requiring the cutting mechanism to be accessed from below.

Figure 16:
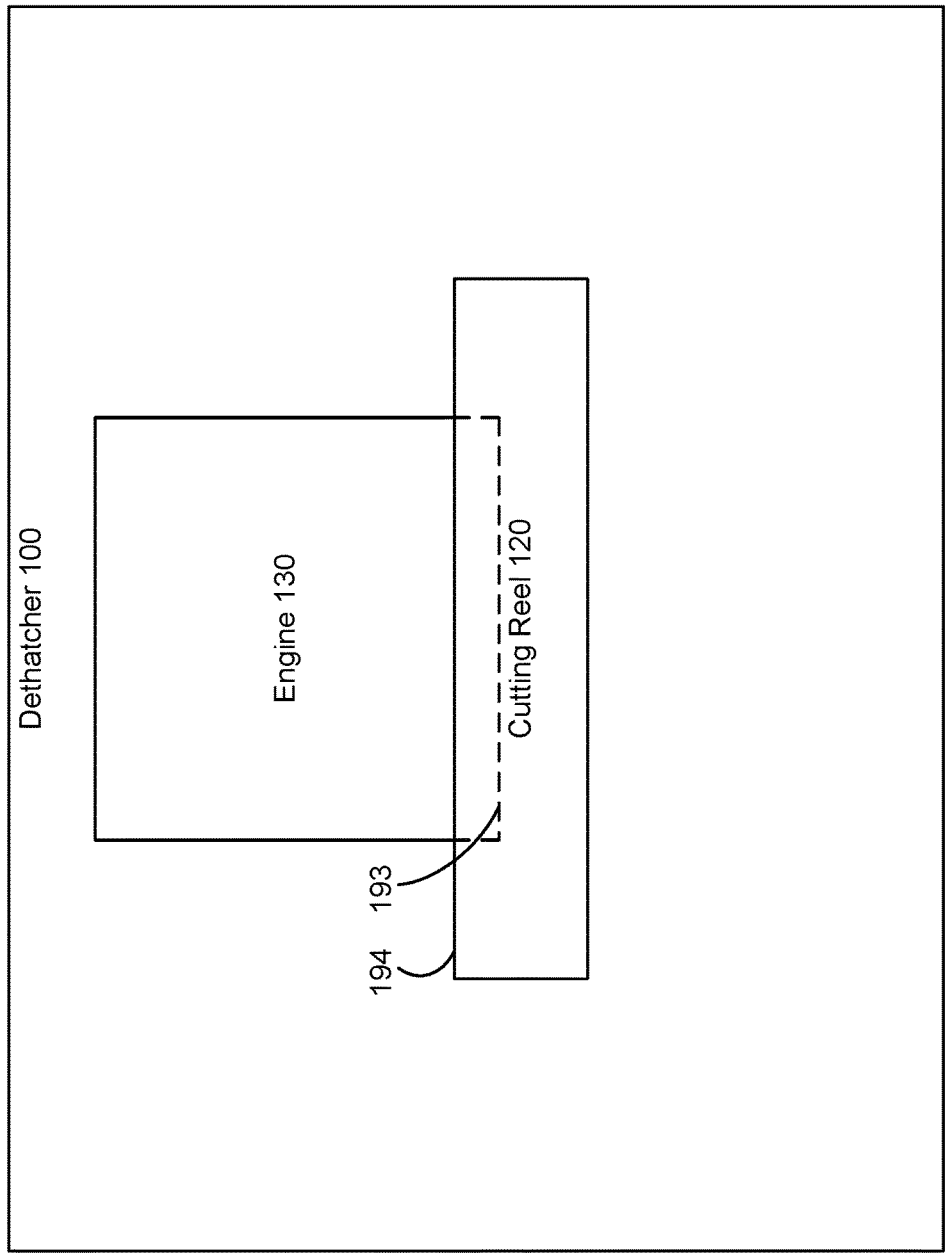
FIG. 16 is a schematic view of the dethatcher of FIG. 2A according to some embodiments.

Instead of locating the engine 130 atop the cutting reel 120 as is customary in the art, the engine 130 is supported by the frame 110 behind the cutting reel 120 (i.e., toward the frame rear end 110b, with the cutting reel 120 being between the engine 130 and the frame front end 110a), such that a bottom 193 of the engine 130 is below a top 194 of the cutting reel 120 when the cutting reel 120 is in use. This configuration is shown in FIG. 16 and may be particularly important in obtaining a relatively low profile, and may allow enhanced access to the cutting reel 120 through the cover 114 as the engine does not obstruct access to the cutting reel 120 from above. In addition, the engine 130 may be spaced apart from the frame sides 110c, 110d, such that an imaginary center plane it (FIG. 4) passes through the engine 130. It may be particularly desirable for a distance d3 (FIG. 4) between the engine 130 and the frame side 110c to be at least half of a distance d4 between the engine 130 and the frame side 110d, with the distance d4 being no more than twice the distance d3.

Figure 7A:
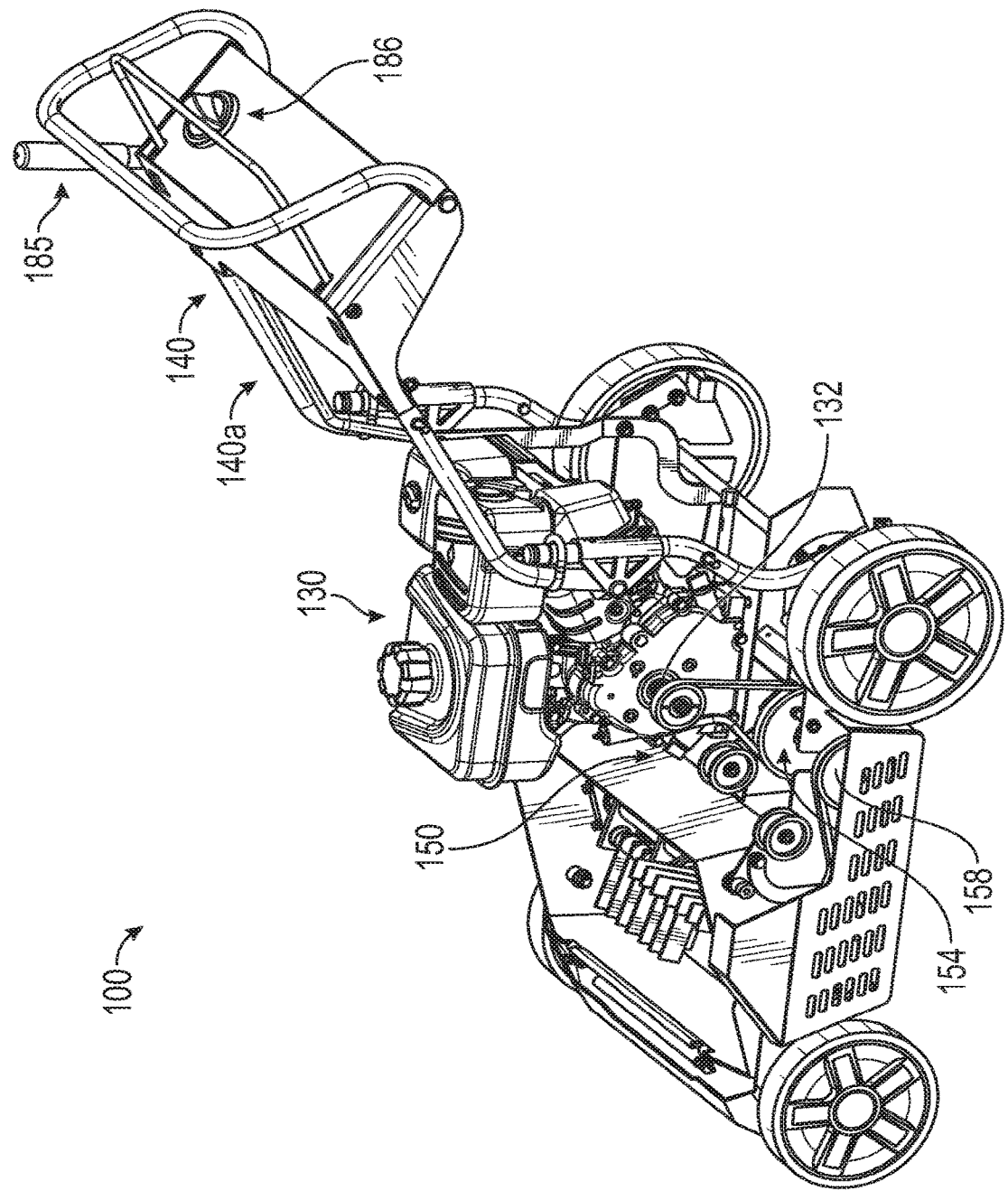
FIG. 7A is another perspective view of the dethatcher of FIG. 2A, shown with portions removed for illustration according to some embodiments.

In some embodiments, the handle 140 may be configurable between a use position and a storage position. FIGS. 2A through 5A, 7A, and 7B, show the handle 140 at a use position 140a, while FIG. 8 shows the handle 140 at a storage position 140b. In some embodiments, the handle 140 is coupled to the frame 110 at the rear end 110b and has a lower portion 142 which extends upwardly from the frame rear end 110b and is generally fixed. In one embodiment, the lower portion 142 in dethatcher 100 includes two separate legs 142a, 142b (FIG. 2B) spaced apart from one another and coupled together only through the frame 110 and an upper portion 144.

Figure 3:
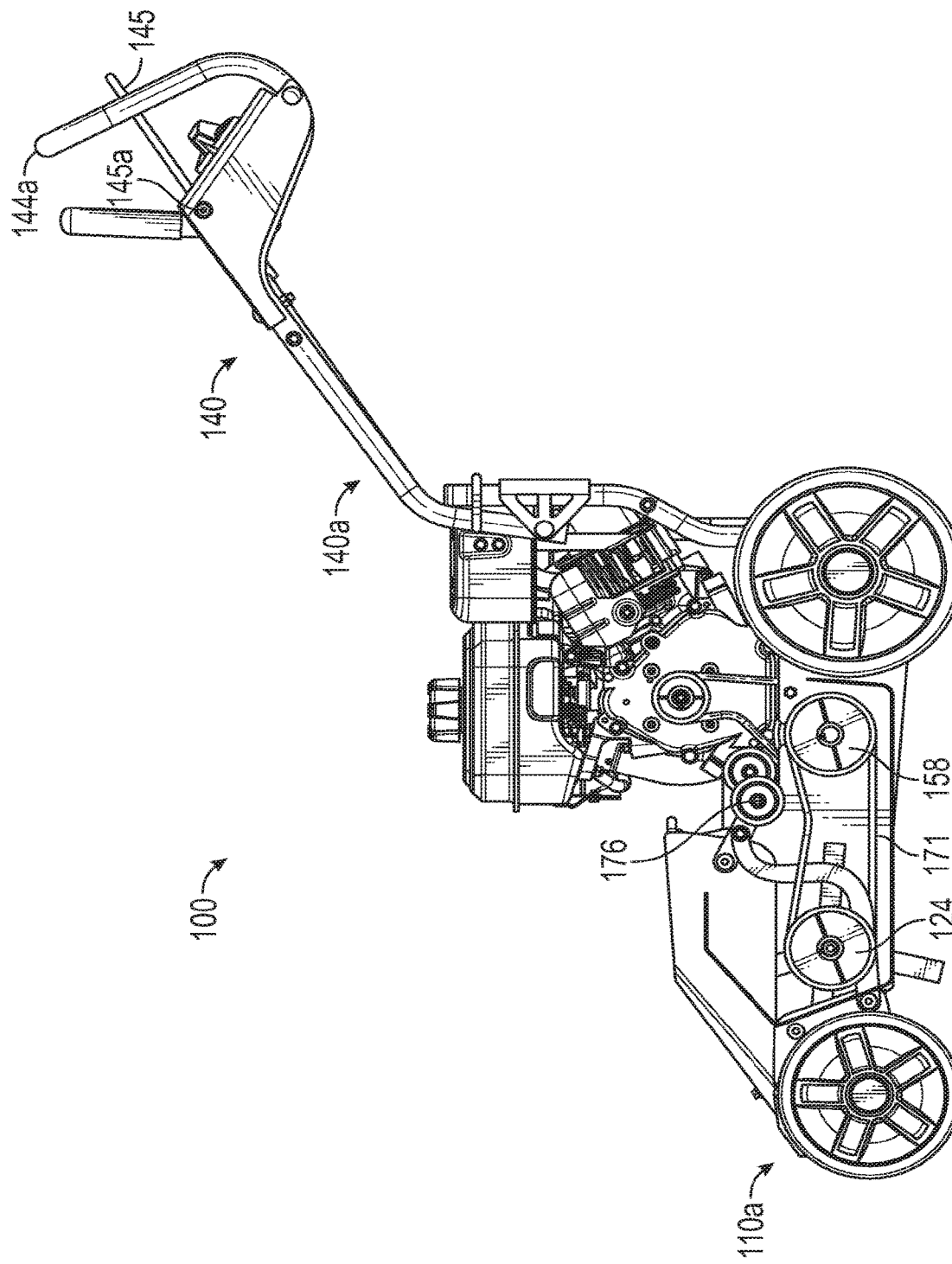
FIG. 3 is a side view of the dethatcher of FIG. 2A, shown with portions removed for illustration according to some embodiments.
Figure 4:
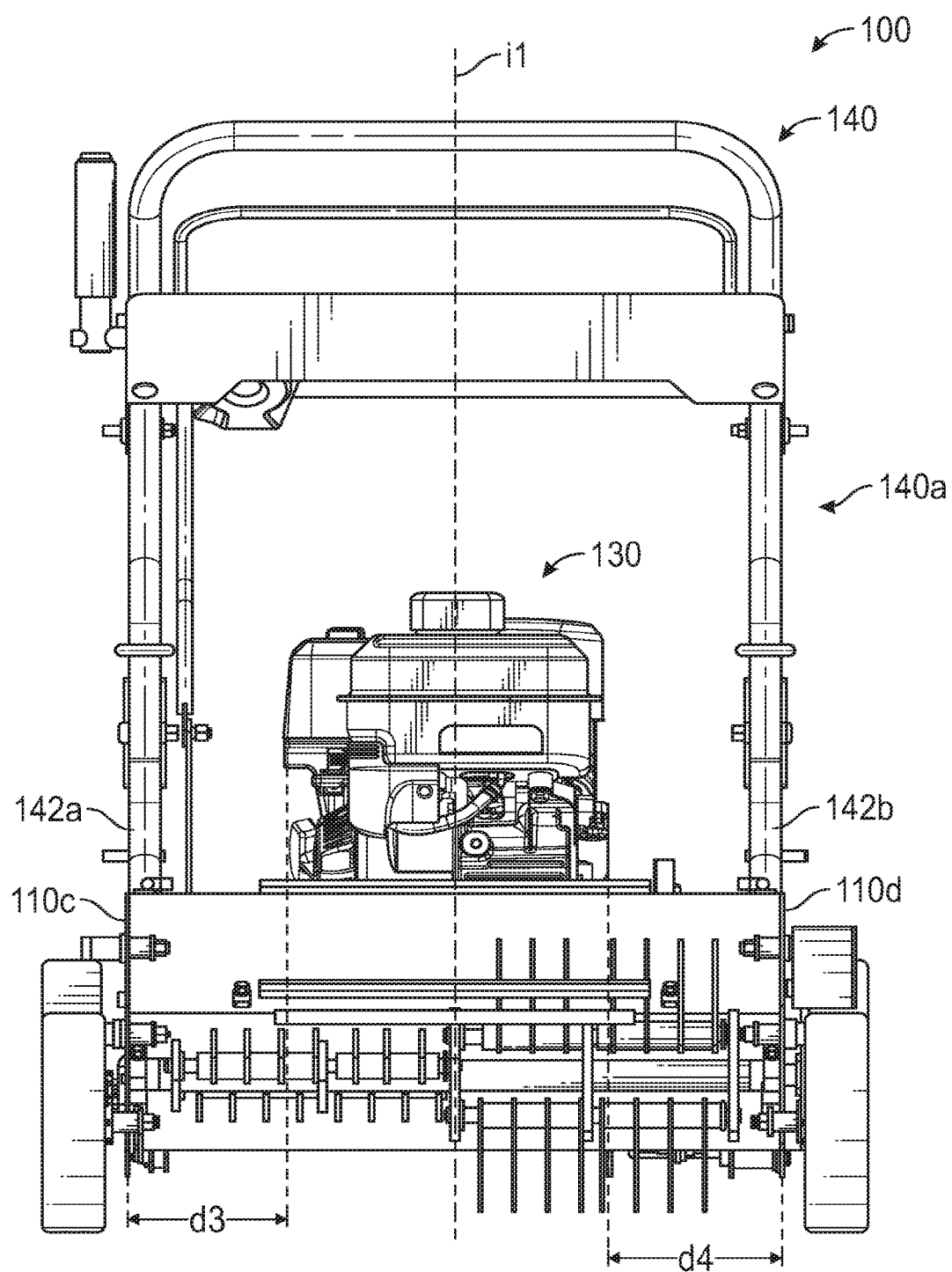
FIG. 4 is a front view of the dethatcher of FIG. 2A, shown with portions removed for illustration according to some embodiments.

As shown in FIG. 2B, the upper portion 144 of the handle 140 has a bail clutch 145 and an operator console 149 and rotates relative to the lower portion 142 (e.g., about pins 146), allowing the handle 140 to move between the use and storage positions 140a, 140b. The bail clutch 145 is coupled to the console 149 (e.g., by bolts or pins) at points 145a (FIG. 7C). This configuration may allow the bail clutch 145 to operate with relatively shorter amounts of displacement (or "throw") than found in prior art dethatchers. Further, the bail clutch 145 may extend under and rearwardly beyond the handle grip portion 144a, as shown in FIG. 3, which may ease user operation—especially in combination with the shorter displacement.

Figure 8:
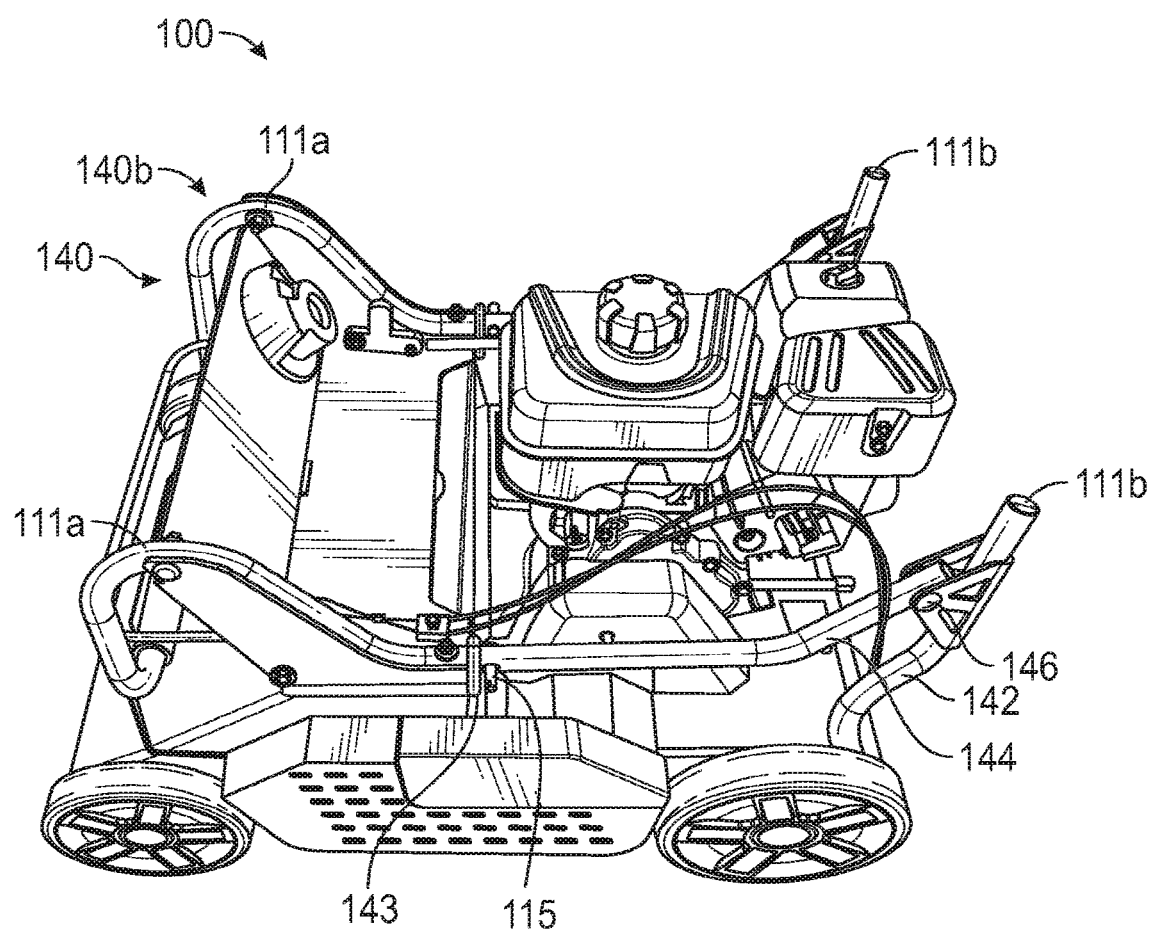
FIG. 8 is another perspective view of the dethatcher of FIG. 2A, but with the handle at a storage position according to some embodiments.
Figure 9:
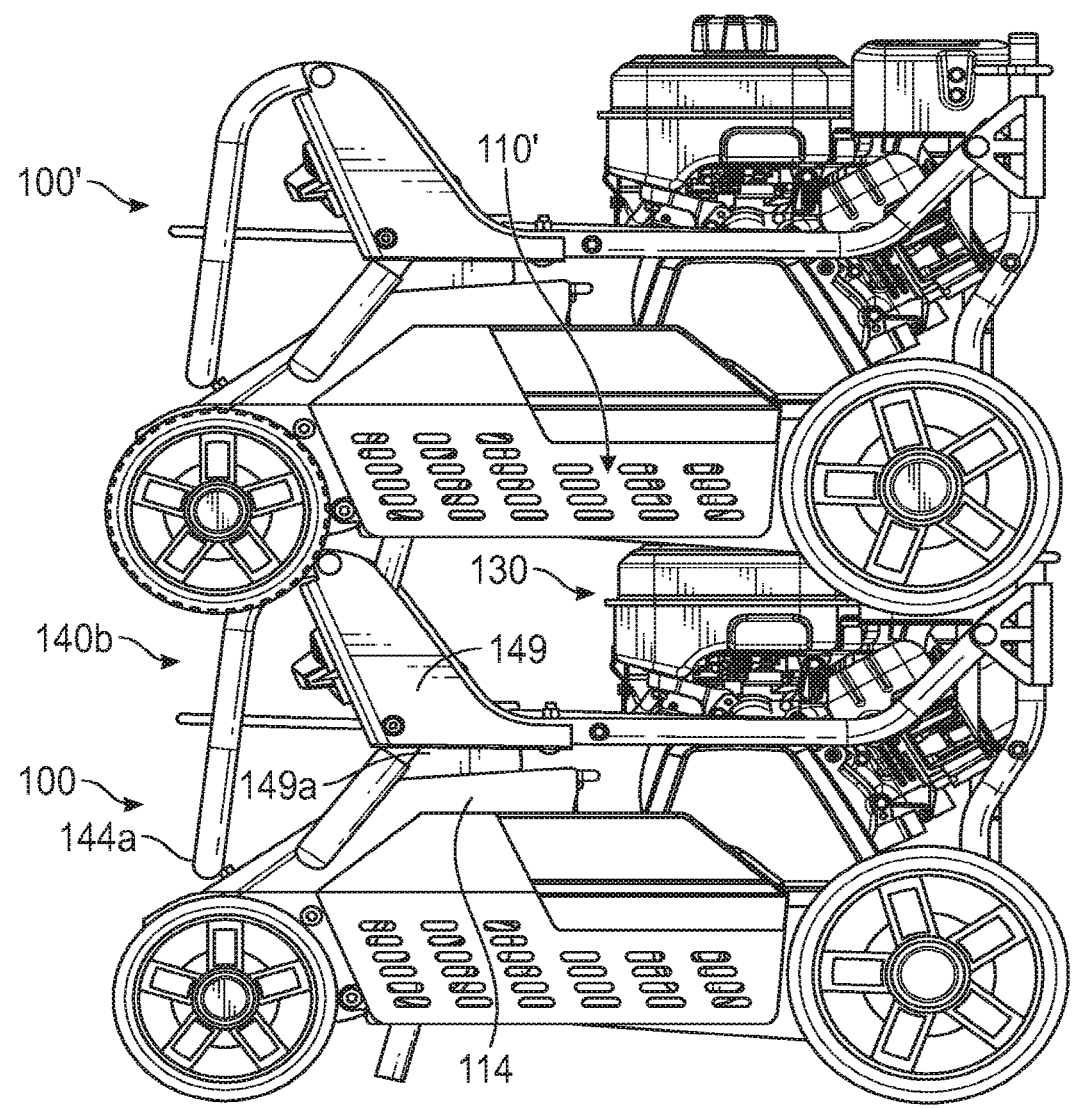
FIG. 9 is another perspective view like FIG. 8, but with a second dethatcher stacked atop the dethatcher of FIG. 2A according to some embodiments.

Pads 149a extend from the console 149 and rest on the frame 110 (e.g., on the cover 114) when the handle 140 is at the storage position 140b (FIG. 9). And the frame front end 110a (e.g., the cover 114) is angled such that an uppermost (or "grip") portion 144a of the handle 140 rests on the angled surface when at the storage position 140b, as shown in FIG. 9. The pads 149a may be constructed of rubber or any appropriate material, and may be replaceable. When at the storage position 140b, the handle 140 defines forward and rearward support points 111a, 111b (FIG. 8), and the bottom of the dethatcher 100 includes at least one recess on the underside of the front end of the frame and at least one cavity on the underside of the rear end of the frame. The recess and the cavity are configured to receive support points 111a and 111b, respectively, such that multiple dethatchers 100 may be stacked and sit atop one another as shown in FIG. 9. Plates, lips, cavities, and other structure may be used on the underside of the dethatcher 100 to achieve this configuration.

As further shown in FIG. 9, the handle 140 is configured and positioned so that, when in the storage position 140b, a substantially identical dethatcher 100' can be supported by the handle 140 in a stacked, nesting configuration, without the dethatcher 100' resting on the engine 130 (though with part of the engine 130 positioned inside frame 110' of the dethatcher 100'). Thus, it may be especially important for the distances d3, d4 (FIG. 4) to be sufficiently large to allow the handle upper portion 144 to pass outside of the engine 130 without interference. In some embodiments, three or more dethatchers may be stacked, with the third stacked and nested atop the second, and so on. Generally, dethatchers are used only sporadically and during certain times of the year, and therefore they are often used as rental equipment and/or owned by lawn care professionals—not the typical homeowner. In commercial and rental environments, floor space can be costly. Accordingly, the ability to stack the dethatchers 100, 100' as shown and described may significantly decrease the amount of floor space needed for storage, and thereby provide cost savings to the owner.

To keep the cables/linkages 182 from becoming misaligned with the handle 140 when at the storage position 140b, an alignment pin 183 (FIG. 7B) may couple the handle lower portion 142 to the cables/linkages 182 (e.g., to alignment plate 182a). The alignment pin 183 may be removable or may interact with a slot in the alignment plate 182a to align the handle lower portion 142 to the cables/linkages 182.

Figure 7B:
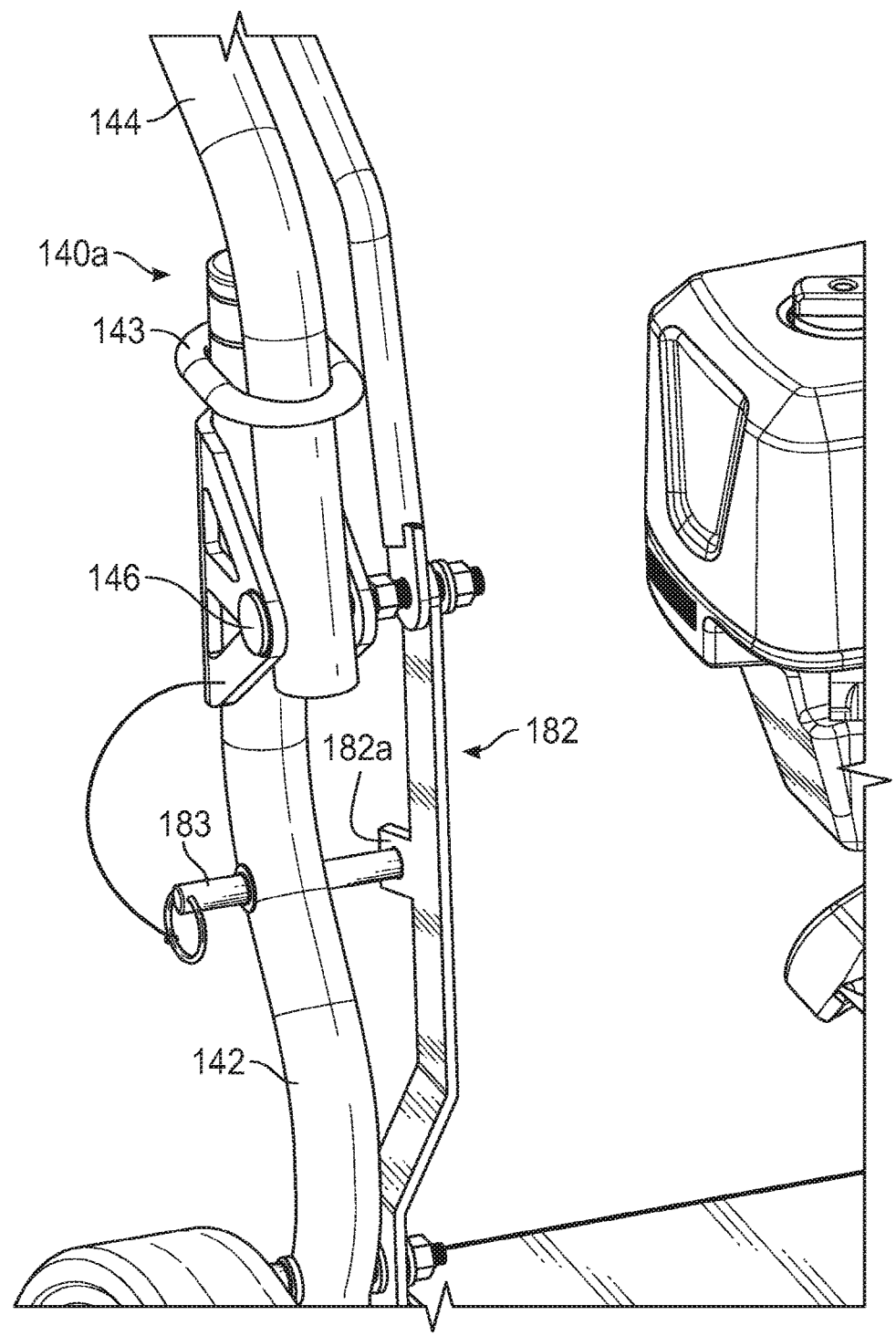
FIG. 7B is a perspective view of a portion of the handle of the dethatcher of FIG. 2A according to some embodiments.
Figure 7C:
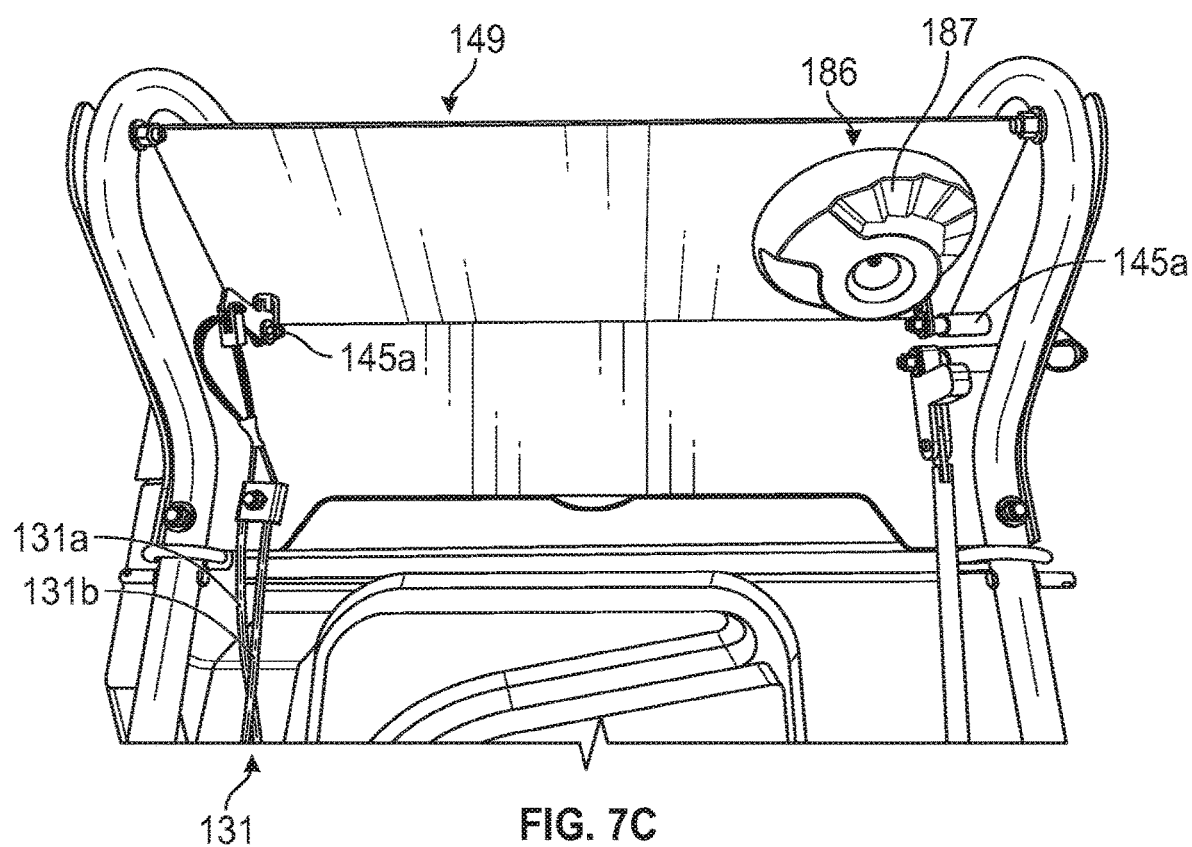
FIG. 7C is another partial perspective view of the dethatcher of FIG. 2A according to some embodiments.

To maintain the handle upper portion 144 at the use and storage positions 140a, 140b, a chain link or other locking device 143 may engage the upper and lower portions 144, 142 when at the use position 140a (FIG. 7B). Further, the chain link or other locking device 143 may engage the upper portion 144 and a hook 115 extending from the frame 110 when the handle upper portion 144 is at the storage position 140b (FIG. 8). In some embodiments, the chain link or other lock 143 may slide along the upper portion 144 and thus may alternately engage the lower portion 142 (in the use position) and the hook 115 (in the store position). In other embodiments, multiple chain links or other locks 143 may be used. The chain link or other lock 143 may be configured to be sufficiently strong to allow the entire weight of the dethatcher 100 to be lifted by the handle upper portion 144 when at the use position 140a.

Turning now to the power transmitting and user control system 150, the engine 130 has an output shaft 132 (FIGS. 5A and 5B) which transmits power to an intermediate shaft 152. The output shaft 132 may transmit power to the intermediate shaft 152 through a belt and pulley arrangement 154, a chain and sprocket arrangement, gearing, or other appropriate device or system. It may be desirable for the intermediate shaft 152 to be below the output shaft 132, as shown in FIG. 5B, to maintain a low profile. The intermediate shaft 152 may further include a self-propel pulley 156 and/or a rake-driving pulley 158. In some embodiments, such as shown in FIG. 5A, the intermediate shaft 152 is supported by split bearing blocks 153 that are the same as the split bearing blocks used for the collars 122 and utilize the same bolts 121, as described above. This may aid in manufacture and repair by utilizing minimal distinct components and allowing a common tool to be used for installation and removal.

As shown in FIG. 5B, a belt 161 couples the self-propel pulley 156 to a driven pulley 162, which in turn powers a differential 164. The differential 164 transmits power to the solid axle 113, causing the rear wheels 112b to turn. A tensioner operated by a user input (e.g., the bail clutch 145) selectively applies tension to the belt 161, allowing force to be transmitted to the driven pulley 162. So when the engine 130—and thus also the output shaft 132 and the intermediate shaft 152—is operating, the rear wheels 112b are not driven if the tensioner is not actuated (i.e., applying tension to the belt 161). If the tensioner is actuated (i.e., applies tension to the belt 161), then the belt 161 transmits force to the driven pulley 162, which then drives the differential 164, the solid axle 113, and ultimately the rear wheels 112b. In some embodiments, the bail clutch 145 is configured to include two separate control lines 131—one line 131a to engage a transmission associated with the engine 130, and another 131b to engage the tensioner (FIG. 7C). Having two separate control lines 131 may allow for increased modular manufacturing.

By powering the driven pulley 162 via the self-propel pulley 156, the self-drive functionality may be easily configured during manufacturing. For example, if self-propel functionality is not desired, the belt 161, the driven pulley 162, the differential 164, and the tensioner may be omitted during manufacturing, without requiring additional components or configurations of components to allow the dethatcher 100 to operate without self-propelling functionality. This can allow for ease of manufacturing, reduced part numbers, and cost savings. In some embodiments, the self-propel pulley 156 may be installed into dethatchers without self-propelling technology to further simplify manufacturing processes. Moreover, if the self-propel pulley 156 is installed even in dethatchers without self-propelling functionality, the current arrangement allows self-propel functionality to be easily added later (e.g., using an aftermarket kit which provides the belt 161, the driven pulley 162, the differential 164, and the tensioner).

Returning now to the rake-driving pulley 158, a belt 171 couples the rake-driving pulley 158 to the cutting reel pulley 124 (FIGS. 3, 5B, 10B, and 11B). A tensioner 176 may be configured to selectively impart tension on the belt 171 to operate the cutting reel pulley 124 (and thus rotate the cutting reel 120). Various configurations may be employed to actuate the tensioner 176. In the dethatcher 100, the operation of the tensioner 176 may be associated with a height of the frame front end 110a, such that the tensioner 176 will not operate the cutting reel pulley 124 until the front end 110a is lowered to a predetermined height. This can be used to prevent the cutting reel 120 from operating except for when the cutting reel 120 is positioned to remove thatch. So, for example, while the front end 110a is raised (FIGS. 10A and 10B), the intermediate shaft 152 may rotate the self-propel pulley 156 and the rake-driving pulley 158. Because the tensioner 176 is not putting sufficient pressure on the belt 171 when the front end 110a is raised, force from the rake-driving pulley 158 is not transferred to the drive mechanism 124; yet the self-propel pulley 156 may power the rear wheels 112b as discussed above. As such, the dethatcher 100 may be transported without the cutting reel 120 undesirably operating.

In one example, a wheel-attachment portion 119 of the frame front end 110a is rotatable about axis 119a, such that the frame front end 110a can be raised (FIGS. 10A, 10B) and lowered (FIGS. 11A, 11B) relative to the front wheels 112a. A user input 181 (FIG. 2A) is operably connected to the wheel-attachment portion 118, such as through various cables and linkages 182 (FIGS. 10A-11A), to force the frame front end 110a to the lowered position or to allow the frame front end 110a to move to (or remain at) the raised position. Springs or other biasing members may bias the frame front end 110a toward the raised position. The user input 181 may include one or multiple devices (levers, knobs, buttons, etc.) to accomplish the desired functionality. The embodiment 100, for example, includes a lever 185 (FIGS. 2A and 2B) and a knob 186 (FIG. 7A).

Figure 10A:
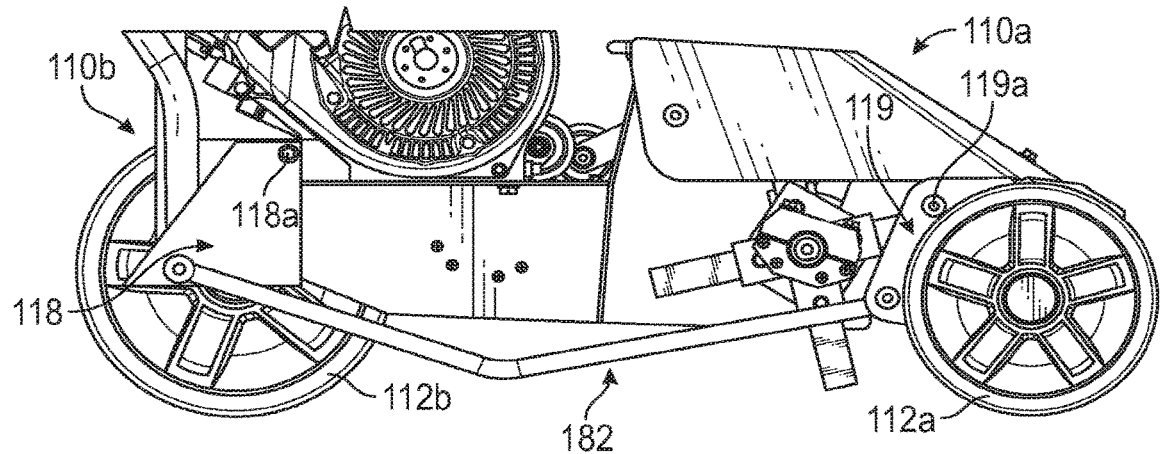
FIG. 10A is a partial side view of the dethatcher of FIG. 2A, shown with the front end at a raised position and portions removed for illustration according to some embodiments.
Figure 10B:
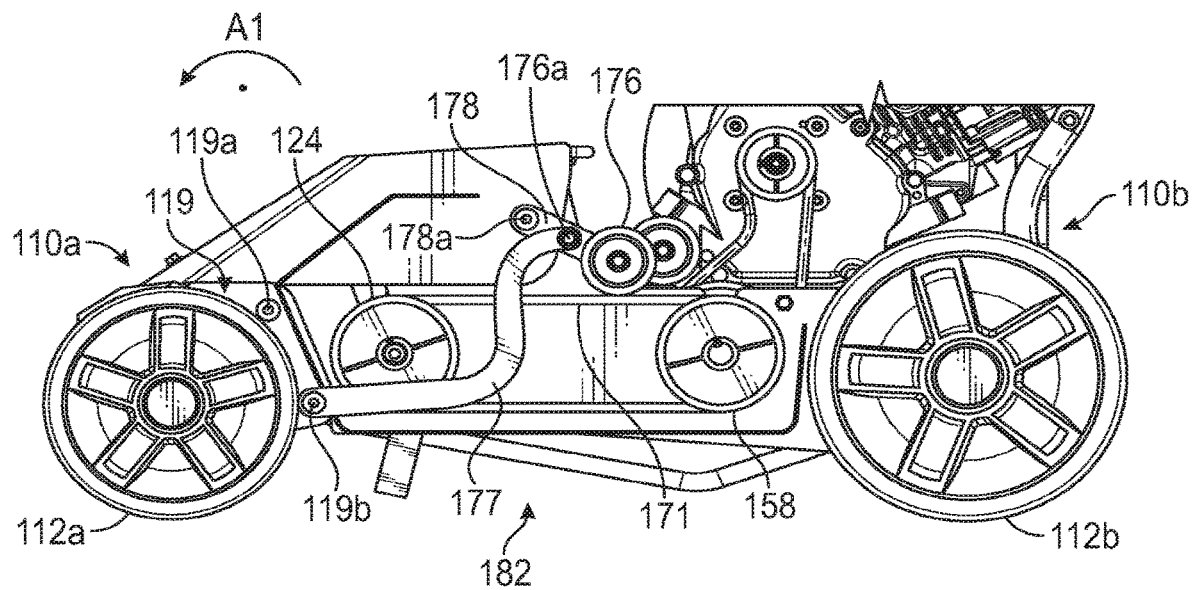
FIG. 10B is another partial side view of the dethatcher of FIG. 2A, shown with the front end at the raised position and portions removed for illustration according to some embodiments.
Figure 11A:
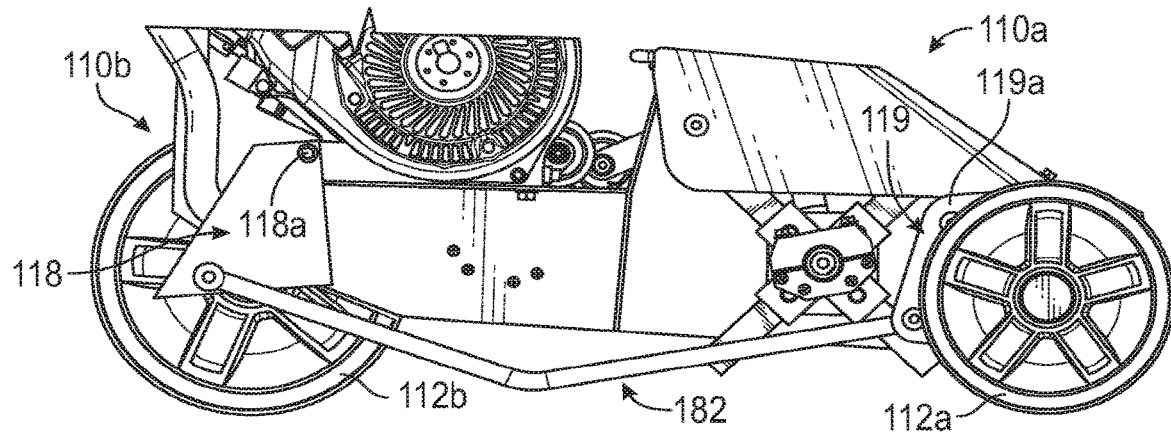
FIG. 11A is a partial side view of the dethatcher of FIG. 2A, shown with the front end at a lowered position and portions removed for illustration according to some embodiments.
Figure 11B:
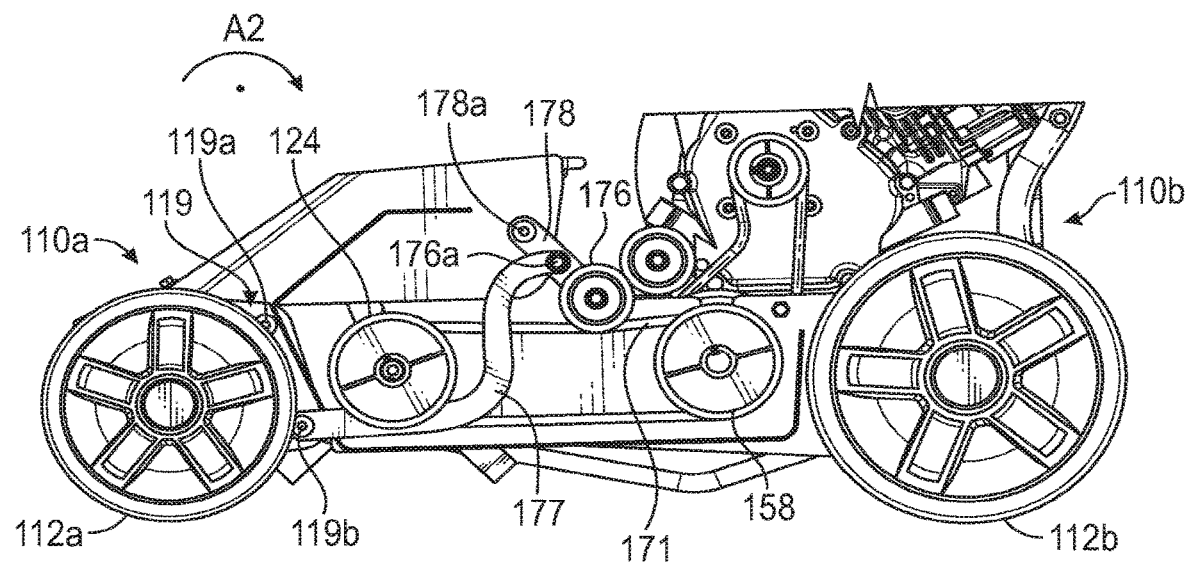
FIG. 11B is another partial side view of the dethatcher of FIG. 2A, shown with the front end at the lowered position and portions removed for illustration according to some embodiments.
Figure 12A:
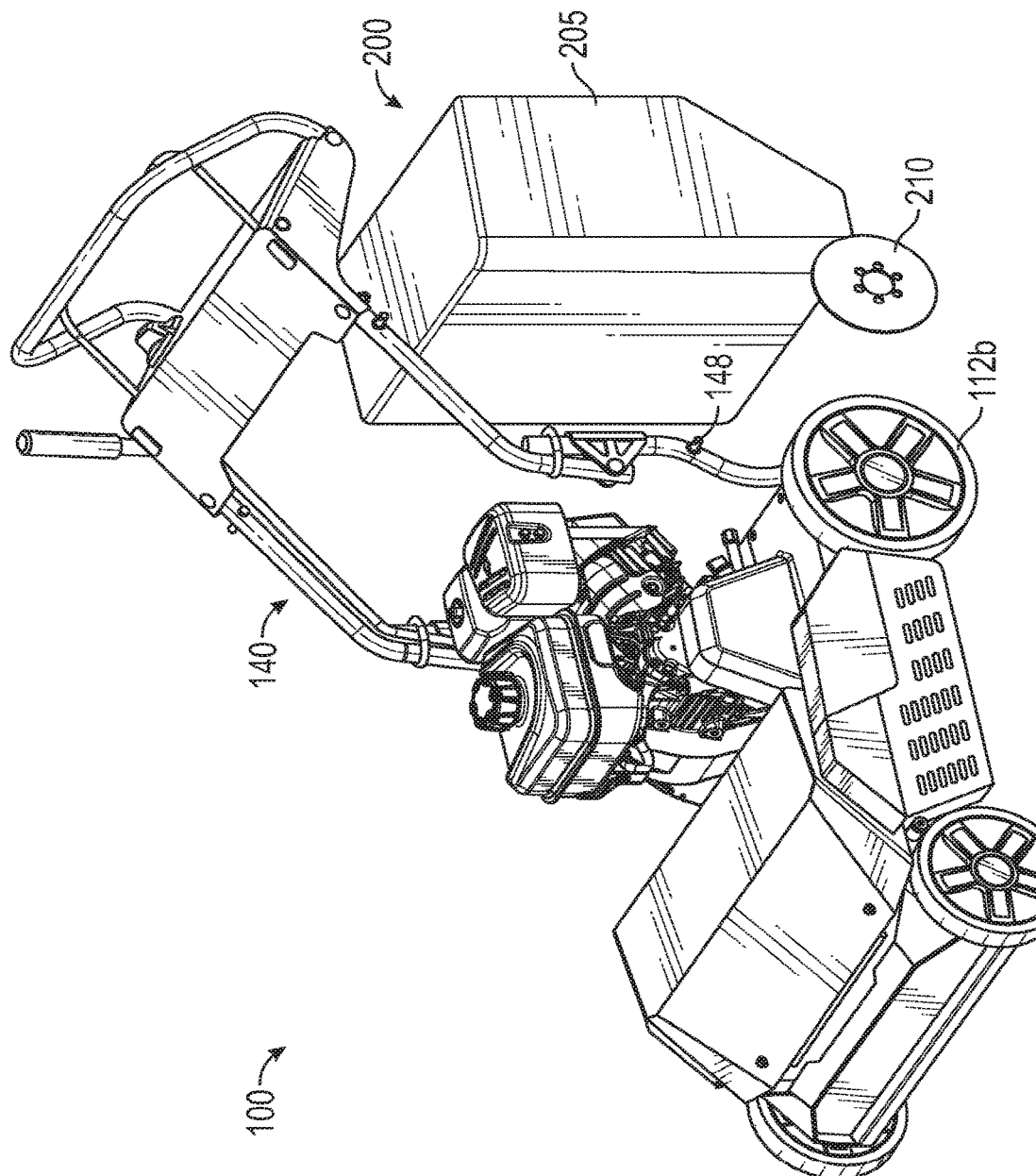
FIG. 12A is another perspective view of the dethatcher of FIG. 2A, shown with a seed box detached according to some embodiments.
Figure 12B:
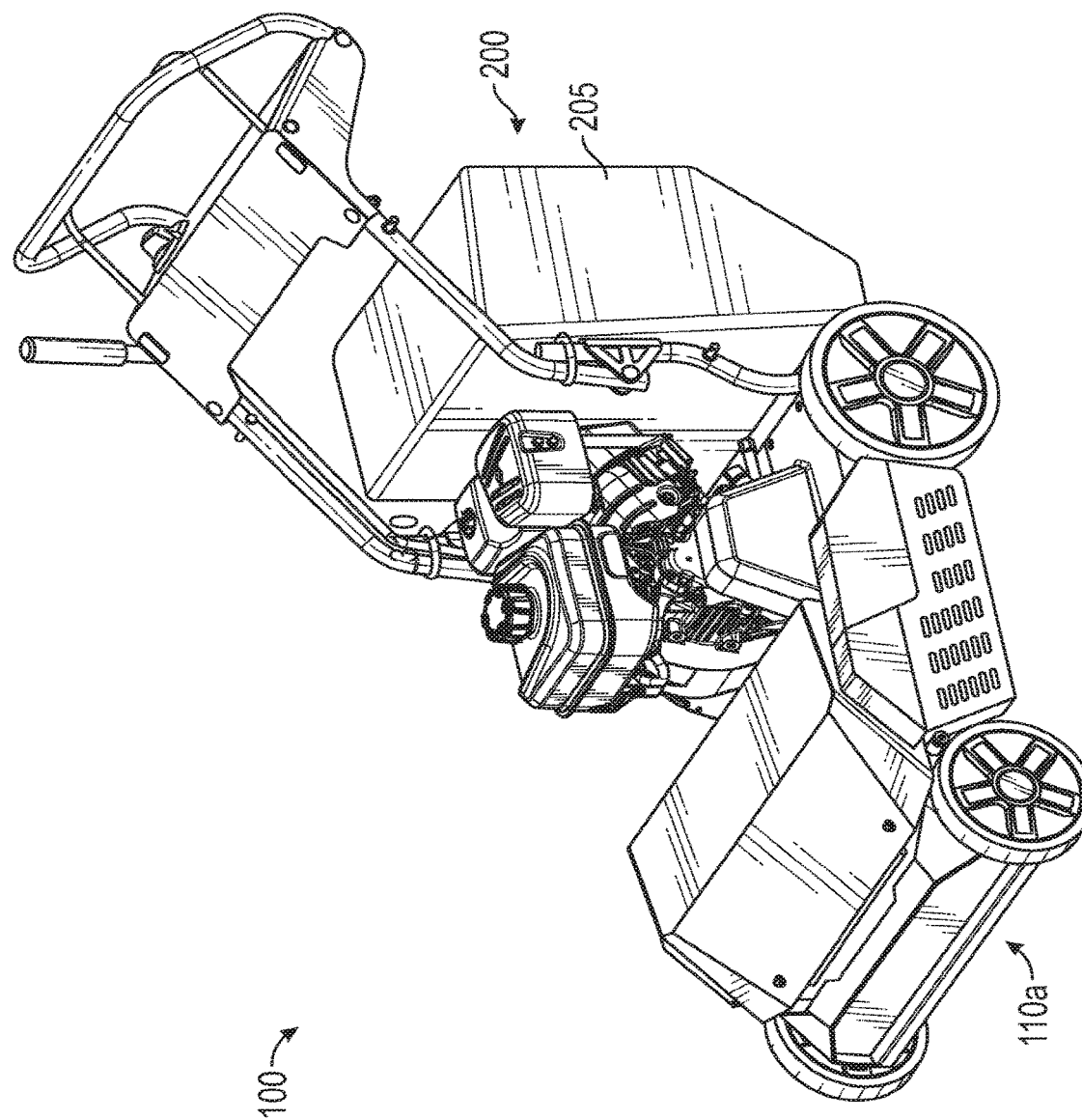
FIG. 12B is another perspective view like FIG. 12A, but with the seed box attached according to some embodiments.

The tensioner 176 is coupled to the frame 110, such as through linkage 178, and is allowed to selectively rotate about axis 178a (FIGS. 10B and 11B). Linkage 177, in turn, couples the linkage 178 to the wheel-attachment portion 119 at pivot point 119b. When the frame front end 110a moves toward the raised position, rotation of the wheel-attachment portion 119 about axis 119a causes (via the linkage 177) the tensioner 176 to rotate in direction A1 and disengage the belt 171—preventing the engine 130 from operating the cutting reel 120 (FIG. 10B). And when the frame front end 110a moves toward the lowered position, rotation of the wheel-attachment portion 119 about axis 119a causes (via the linkage 177) the tensioner 176 to rotate in direction A2 and engage the belt 171, thereby allowing the engine 130 to operate the cutting reel 120 (FIG. 11B). This can allow the self-propel pulley 156 to power the rear wheels 112b when the frame rear end 110b is in the raised position without engaging the belt 171, (and thereby not operating the cutting reel 120), as discussed above. And once the frame rear end 110b moves toward the lowered position, the tensioner 178 may engage the belt 171, thereby operating the cutting reel 120. While the above discussion refers to the front end 110a being raised and lowered, those skilled in the art will appreciate that the rear end 110b may instead (or additionally) be raised and lowered using structure and methods corresponding to those used to raise and lower the front end 110a.

Once the tensioner 176 sufficiently engages the belt 171 to operate the cutting reel pulley 124 (and thus the cutting reel 120), the operator may control the depth of the cutting reel 120 into the grass as desired by further adjusting the height of the front end 110a. In some embodiments, the user input 181 has multiple settings to allow both macro and micro adjustments. For example, tilting or sliding the lever 185 (e.g., about axis 181b, shown in FIG. 2B) may cause relatively large adjustment to the cables and linkages 182 (and thus to the height of the frame front end 110a), while rotating the lever 185 about axis 181a (FIG. 2A) may cause relatively small adjustment of the frame front end 110a. Additionally, or alternately, rotating the knob 186 (FIGS. 7A and 7C) may cause relatively small adjustments to the cables and linkages 182 (and thus to the frame height). A generally vertical setting of the lever 185 may correlate to the raised position, a tilted setting of the lever 185 may correlate to the lowered position, and rotation of the lever 185 and/or use of the knob 186 may fine-tune the height of the frame front end 110a. FIG. 7C shows that a bottom side of the knob 186 may include steps 187, and each step 187 may correlate to a predefined height adjustment of the front end 110a (e.g., a quarter inch of height adjustment). The knob 186 may limit the travel of the lever 185, and the knob 186 may act as a stop for the lever 185. In some embodiments, the user input 181 may include index markings for desired heights associated with a given cutting reel 120 type. In one example, the index markings may be shown on both the lever 185 and the knob 186. In some instances, the index markings may be associated with a corresponding index number on the cutting reel 120, thereby allowing the operator to quickly determine the height setting associated with the cutting reel 120.

The power transmitting and user control system 150 may further include various safety features. For example, a kill switch, such as a proximity switch, a limit switch, and the like may be positioned to interact with the cover 114 so that the engine 130 cannot operate if the cutting reel 120 is uncovered (e.g. the cover 114 is moved to uncover the cutting reel 120). And though various parts of the power transmitting and user control system 150 are illustrated in some of the figures as being uncovered, those skilled in the art will appreciate that various covers or guards may be used to restrict access as desired.

FIGS. 12A through 13B show an optional seed box 200 in use with the dethatcher 100. The seed box 200 is removably coupled to the handle 140 and/or the frame rear end 110b and includes a container portion 205 and a gear or wheel 210 which interacts with one of the rear wheels 112b to activate seed dispersal from the container portion 205. Various fasteners and methods may be used to couple the seed box 200 to the dethatcher 100. For example, straps extending from the container portion 205 may selectively fasten to the handle 140, such as at pins or buckles 148 extending from the handle 140. And at least one bracket may extend from the frame rear end 110b to support the seed box 200.

A wire frame may also support the seed box 200 and be connected to the dethatcher 100. It may be desirable for the wire frame to be rotatable downward to create a stand for the seed box 200 when the seed box 200 is separated from the dethatcher 100. Rotating the wire frame in the downward direction when the seed box 200 is detached from the dethatcher 100 may prevent the seed box 200 from resting on the gear 210 and also permit the seed box 200 to be easily filled.

Figure 13A:
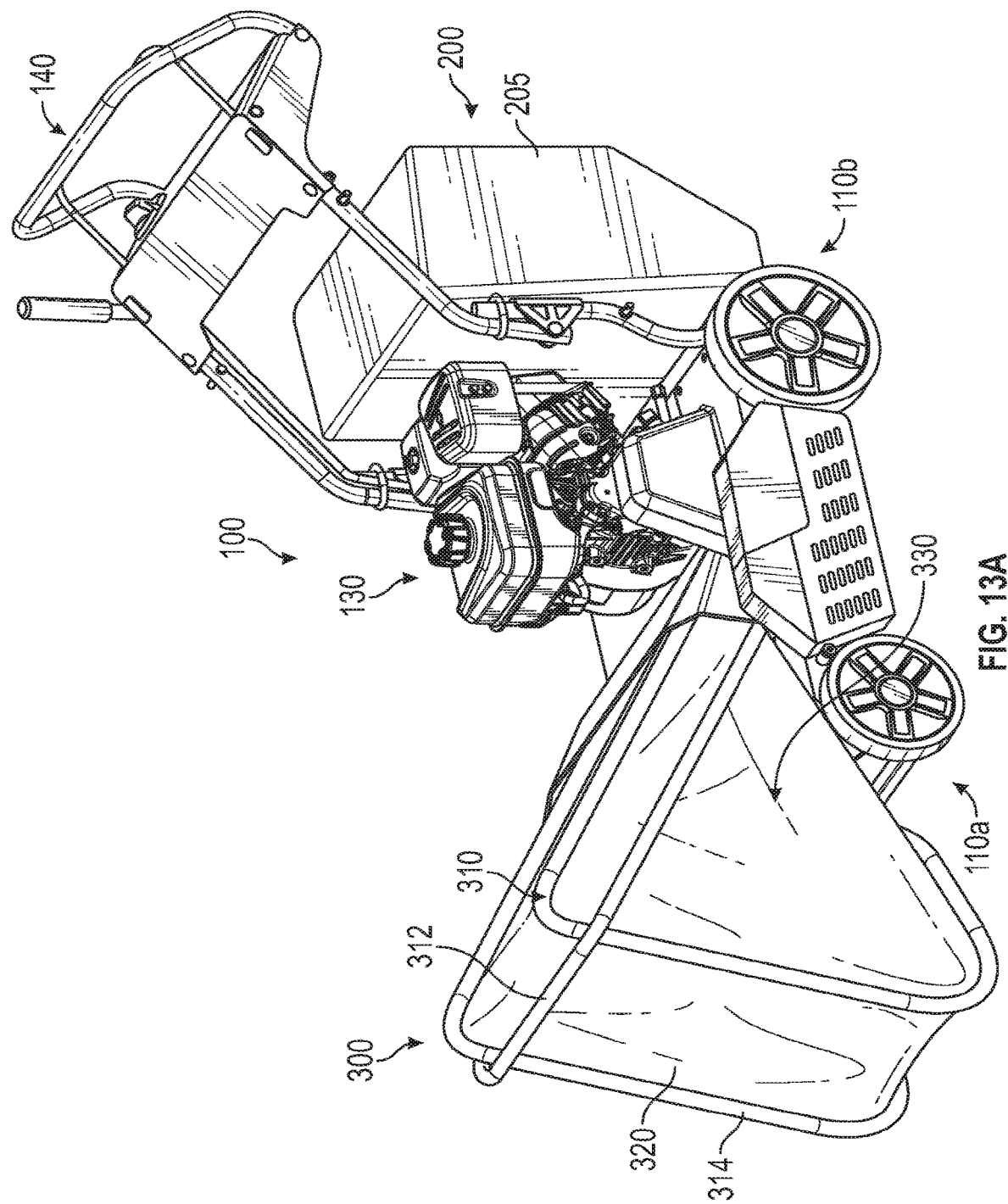
FIG. 13A is another perspective view like FIG. 12B, but with a bagger attached according to some embodiments.
Figure 13B:
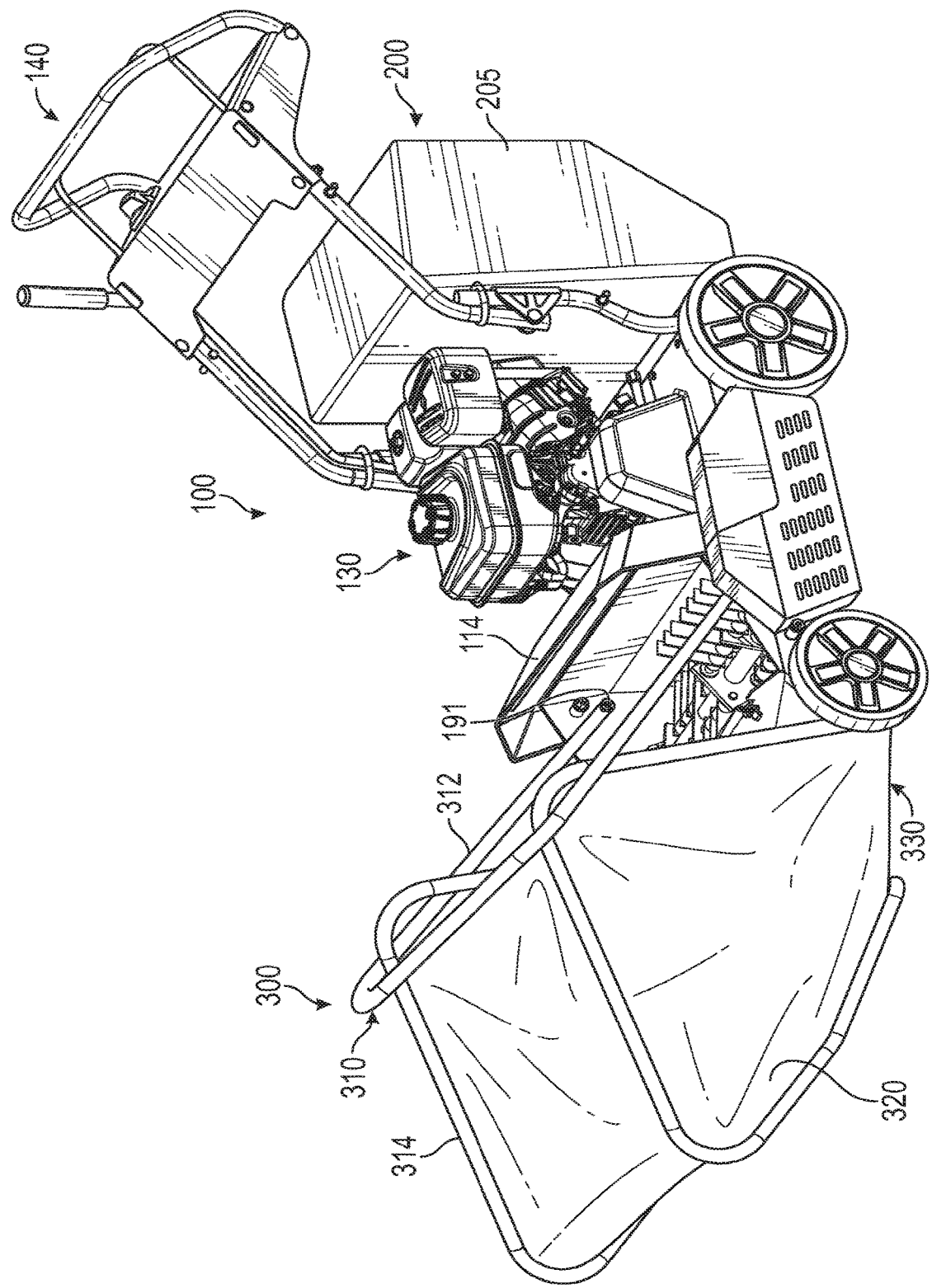
FIG. 13B is another perspective view like FIG. 13A, but with the bagger at an emptying configuration according to some embodiments.

FIGS. 13A and 13B show an optional bagger 300 in use with the dethatcher 100. In one embodiment, the handle 140 is near the rear end 110b of the frame 110, the engine 130 is located between the handle 140 and the cutting reel 120, the cutting reel 120 powered by the engine 130 is located between the engine 130 and the bagger 300, and the bagger 300 is located near the front-most portion of the front end 110a of the frame 110. The bagger 300 has a frame 310 and material 320 surrounding and supported by the frame 310, which substantially prevents debris from passing through. In one embodiment, the bagger 300 is coupled to the frame 110 at the front end 110a, such that the bagger 300 extends in front of the dethatcher 100. By coupling the bagger 300 to the front end 110a of the frame 110, an opening 330 in the bagger 300 is positioned to align with an opening caused by the cover 114 being in an open position. A spring pin, latch, or other device may be used to maintain the cover 114 in the open position, or the cover may be configured to rest against the bagger 300.

Figure 1D:
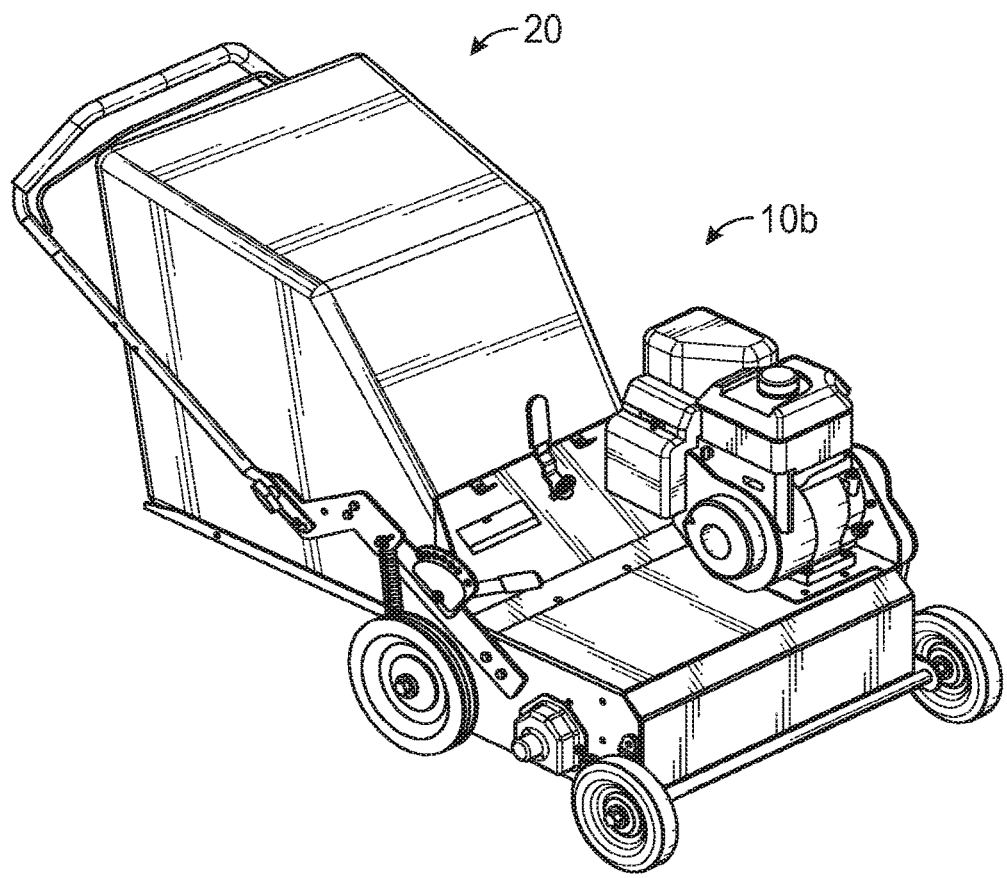
Figure 1E:
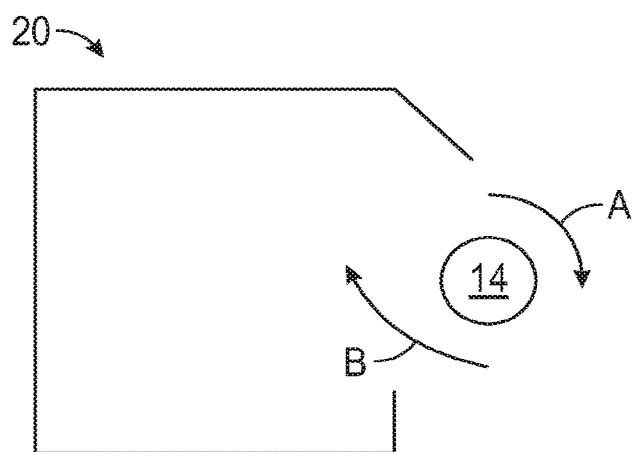
Figure 15:
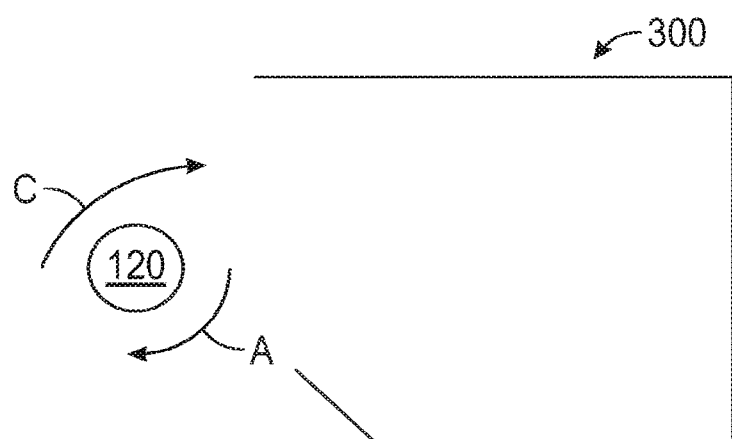
FIG. 15 schematically illustrates use of the bagger of FIG. 13A according to some embodiments.

Placement of the bagger 300 at the front of the dethatcher improves the filling characteristics of the bagger 300 compared to the prior art. Looking, for example, at the prior art dethatcher 10b (FIGS. 1D and 1E), the cutting reel 14 rotates in direction A and the debris enters the bagger 20 along an arc B extending from a lower part of the cutting reel 14. In the dethatcher 100 and the bagger 300, on the other hand, the cutting reel 120 still rotates in direction A, but the debris enters the bagger 300 along an arc C extending from an upper part of the cutting reel 120 (FIG. 15). This direction of debris flow may allow more complete filling of the bagger 300 and better airflow inside the bagger 300 by allowing the debris to flow up and over any existing debris in the bagger 300 before dropping down. In contrast, the debris in the prior art dethatcher 10b may be easily obstructed by debris already within the bagger, thereby reducing the amount of debris that can be placed in the bagger at any given time.

In some embodiments, the frame 310 of the bagger 300 may include two portions 312, 314 rotatable relative to one another, with the first portion 312 being fixed relative to the frame 110 and with the second portion 314 supporting the material 320. With this rotating configuration, the bagger 300 may be emptied by rotating the second portion 314 as shown in FIG. 13B. The first portion 312 may be fixed to the frame 110 by being received in housings 191, as shown in FIG. 13B, or through other attachment devices and methods, whether now known or later developed. In one example, the first portion 312 may be selectively removable from the frame 110.

If a kill switch is associated with the cover 114 as discussed above, the bagger 300 may interact with the kill switch or a separate additional kill switch so that the engine 130 is allowed to operate when the bagger 300 is attached to the frame 110. For example, the bagger 300 may be configured to include a bypass circuit (not shown) to override the operation of the kill switch on the dethatcher 100, and rely instead on a kill switch associated with the bagger 300 upon installation of the bagger. In some examples, if the housings 191 are utilized, the kill switch may be located inside a housing 191 to allow operation only when the first portion 312 is fully inserted; but other locations for the kill switch are clearly envisioned.

In some embodiments, a bagger shield may be inserted with the bagger 300 into the opening for the cutting reel 120, such that the bagger shield is located above the cutting reel 120 and connected to the frame 310 with the bagger shield hanging lower than the frame 110 and allowing the thatch to flow up the bagger shield and into the bagger 300.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. The specific configurations and contours set forth in the accompanying drawings are illustrative and not limiting.

What is claimed is:

1. A method of stacking dethatchers, comprising:
positioning a first dethatcher, the first dethatcher comprising a handle, wherein the handle defines support points comprising a first support point arranged at a forward portion of the handle and a second support point arranged at a rearward portion of the handle;
pivoting the handle of the first dethatcher into a storage position; and
stacking a second dethatcher on the first dethatcher, wherein stacking the second dethatcher on the first dethatcher comprises supporting the second dethatcher on the support points on the handle of the first dethatcher.

2. The method of claim 1, wherein pivoting the handle of the first dethatcher into the storage position comprises:
rotating an upper portion of the handle relative to a lower portion of the handle.

3. The method of claim 1, wherein pivoting the handle of the first dethatcher into the storage position comprises:
pivoting a grip portion of the handle toward a front end of a frame of the first dethatcher.

4. The method of claim 1, wherein pivoting the handle of the first dethatcher into the storage position comprises:
pivoting a grip portion of the handle so that the grip portion is supported on a front end of a frame of the first dethatcher.

5. The method of claim 1, wherein pivoting the handle of the first dethatcher into the storage position comprises:
pivoting a console of the handle so that a pad that extends from the console engages a frame of the first dethatcher.

6. A method of stacking dethatchers, comprising:
pivoting an upper portion of a handle on a first dethatcher toward a front end of a frame on the first dethatcher;
upon pivoting the upper portion of the handle toward the front end of the frame, exposing a rear support point defined by a lower portion of the handle; and
stacking a second dethatcher on the first dethatcher so that the second dethatcher is supported on the rear support point defined by the lower portion of the handle and a front support point defined by the upper portion of the handle.

7. The method of claim 6, wherein pivoting the upper portion of the handle toward the front end of the frame on the first dethatcher comprises:
pivoting the upper portion so that the upper portion pivots past an engine of the first dethatcher without engaging the engine.

8. The method of claim 6, wherein pivoting the upper portion of the handle toward the front end of the frame on the first dethatcher comprises:
pivoting a grip portion of the upper portion so that the grip portion is supported on the front end of the frame.

9. The method of claim 6, wherein pivoting the upper portion of the handle toward the front end of the frame on the first dethatcher comprises:
pivoting a console of the upper portion so that a pad that extends from the console engages the frame.

10. A dethatcher assembly, comprising:
a first dethatcher, including:
a first frame; and
a first handle coupled to the first frame, wherein the first handle includes a first upper portion pivotably coupled to a first lower portion so that the first upper portion is configured to pivot between a use position and a storage position; and
a second dethatcher, comprising:
a second frame; and
a second handle coupled to the second frame;
wherein when the first upper portion is in the storage position, the second dethatcher is configured to stack upon the first dethatcher so that the second dethatcher is supported on the first handle of the first dethatcher.

11. The dethatcher assembly of claim 10, wherein when the first upper portion is in the storage position, the first upper portion is spaced from a first engine of the first dethatcher.

12. The dethatcher assembly of claim 11, wherein the second dethatcher is configured to stack upon the first dethatcher without interfering with the first engine.

13. The dethatcher assembly of claim 10, wherein when the first upper portion is pivoted from the use position to the storage position, the first upper portion is pivoted toward a front end of the first frame.

14. The dethatcher assembly of claim 13, wherein when the first upper portion is in the storage position, a grip portion of the first upper portion is supported on the front end of the first frame.

15. The dethatcher assembly of claim 13, wherein a console of the first upper portion includes a pad extending outwardly from the console.

16. The dethatcher assembly of claim 15, wherein when the first upper portion is in the storage position, the pad engages the first frame.

17. The dethatcher assembly of claim 10, wherein when the first upper portion is in the storage position, the first lower portion of the first handle defines a rear support point and the first upper portion defines a front support point.

18. The dethatcher assembly of claim 17, wherein the second dethatcher is configured to stack upon the first dethatcher and be supported on the rear support point and the front support point.

* * * * *